(12) United States Patent
Poliakov et al.

(10) Patent No.: US 10,013,494 B2
(45) Date of Patent: Jul. 3, 2018

(54) INTEREST PROFILE OF A USER OF A MOBILE APPLICATION

(71) Applicant: LOCOMIZER LTD, London (GB)

(72) Inventors: Alexei Poliakov, London (GB); Alexei Poliakov, Tokyo (JP)

(73) Assignee: LOCOMIZER LTD, London (GB)

( * ) Notice: Subject to any disclaimer, the term of this patent is extended or adjusted under 35 U.S.C. 154(b) by 473 days.

(21) Appl. No.: 14/404,903

(22) PCT Filed: Jun. 3, 2013

(86) PCT No.: PCT/GB2013/051475
§ 371 (c)(1),
(2) Date: Dec. 1, 2014

(87) PCT Pub. No.: WO2013/179071
PCT Pub. Date: Dec. 5, 2013

(65) Prior Publication Data
US 2015/0193543 A1 Jul. 9, 2015

Related U.S. Application Data

(60) Provisional application No. 61/654,716, filed on Jun. 1, 2012.

(51) Int. Cl.
*G06F 7/00* (2006.01)
*G06F 17/30* (2006.01)
(Continued)

(52) U.S. Cl.
CPC .... *G06F 17/30867* (2013.01); *G06F 17/3087* (2013.01); *G06Q 30/02* (2013.01); *H04L 67/306* (2013.01); *H04W 4/02* (2013.01)

(58) Field of Classification Search
None
See application file for complete search history.

(56) References Cited

U.S. PATENT DOCUMENTS 9,679,061 B2* 6/2017 Narasimhan ...... G06F 17/30867
2002/0103892 A1* 8/2002 Rieger, III ........ G06F 17/30241
709/223

(Continued)

FOREIGN PATENT DOCUMENTS

GB 2464675 A 4/2010

*Primary Examiner* — Uyen Le
(74) *Attorney, Agent, or Firm* — Birch, Stewart, Kolasch & Birch, LLP

(57) ABSTRACT

At least one application is executable to communicate with a check-in service configured to receive check-in data comprising identification data of the user of at least one application executable on or accessible via an electronic device, location data of a venue for which the user is able to perform a check-in event via said application or said service, and time data for the check-in event indicative of when the check-in event took place. The check-in data is obtained and then analyzed to identify at least one activity taking place within the given geographical area and at least one corresponding venue within the given geographical area. At least one corresponding venue with regard to the corresponding at least one activity is categorized. The interest profile is generated or amended by the user based on the step of analysing. The interest profile comprises data of the user's interaction with the at least one activity corresponding to the at least one venue.

25 Claims, 37 Drawing Sheets

(51) Int. Cl.
  *G06Q 30/02*   (2012.01)
  *H04L 29/08*   (2006.01)
  *H04W 4/02*    (2018.01)

(56) References Cited

U.S. PATENT DOCUMENTS

| | | | |
|---|---|---|---|
| 2008/0201321 A1 | 8/2008 | Fitzpatrick et al. | |
| 2010/0114968 A1* | 5/2010 | Dean | G06F 17/30749 |
| | | | 707/796 |
| 2013/0103810 A1* | 4/2013 | Papakipos | G06Q 50/01 |
| | | | 709/221 |
| 2013/0150091 A1* | 6/2013 | Ingram | G08G 1/20 |
| | | | 455/456.3 |
| 2013/0260681 A1* | 10/2013 | Hsi | H04W 4/008 |
| | | | 455/41.1 |
| 2013/0317910 A1* | 11/2013 | Mohamed | G06Q 30/0269 |
| | | | 705/14.58 |
| 2017/0195338 A1* | 7/2017 | Richter | H04L 63/102 |

* cited by examiner

FIG. 1 Obtaining check-in profiles of users of location-based service applications (LBS), i.e. Foursquare Check-in profile:

| | | Foursquare user_ 32 | | Foursquare user_ 2584 |
|---|---|---|---|---|
| I. Personal data | User ID | 32 | User ID | 2584 |
| | First Name | Den | First Name | Alexei |
| | Last Name | Crowley | Last Name | Poliakov |
| | Photo | https://...jpg | Photo | https://...jpg |
| | Contact Telephone | 212 949 7945 | Contact Telephone | 020 7672 2993 |
| | Contact email | den@foursquare.com | Contact email | alexei@alexie.com |
| | Gender | male | Gender | male |
| | Home City | NewYork, NY | Home City | London, UK |
| II. Check-in data | Check-in_1 ID | 4bf58dd8d48988d111941735 | Check-in_1 ID | 4acdd67ff964a52033cd20e3 |
| | Venue ID | 4e954a064901 5a0 78d51e67b | Venue ID | 4d8c572e2da46ea82173246d |
| | Venue Name | Virgin Active Health Club | Venue Name | The Phoenix Cinema |
| | Address | 34 Langstone Way, London, UK | Address | 52 High Road, London, UK |
| | Postcode | NW7 1GU | Postcode | N2 9PJ |
| | Contact Telephone | 020 8876 5436 | Contact Telephone | 020 8444 6789 |
| | Latitude | 51.607331 | Latitude | 51.588238 |
| | Longitude | -0.210277 | Longitude | -0.164094 |
| | Category ID | 4bf58dd8d48988d175 | Category ID | 4bf58dd8d48988d17f941735 |
| | CategoryName | Gym or Fitness Centre | CategoryName | Movie Theatre |
| | Date/Time | 22.09.2011/19.37 (GMT) | Date/Time | 17.10.2011/16.37 (GMT) |
| | ... | | ... | |
| | Check-in_2 ID | 4bf58dd8d48988d15a941735 | Check-in_2 ID | 4b7ffcd1f964a520e94830e3 |
| | ... | | ... | |

FIG. 2 Creating user profiles in the locomizer check-in database

Mapping check-ins of locomizer user_1 and user_2

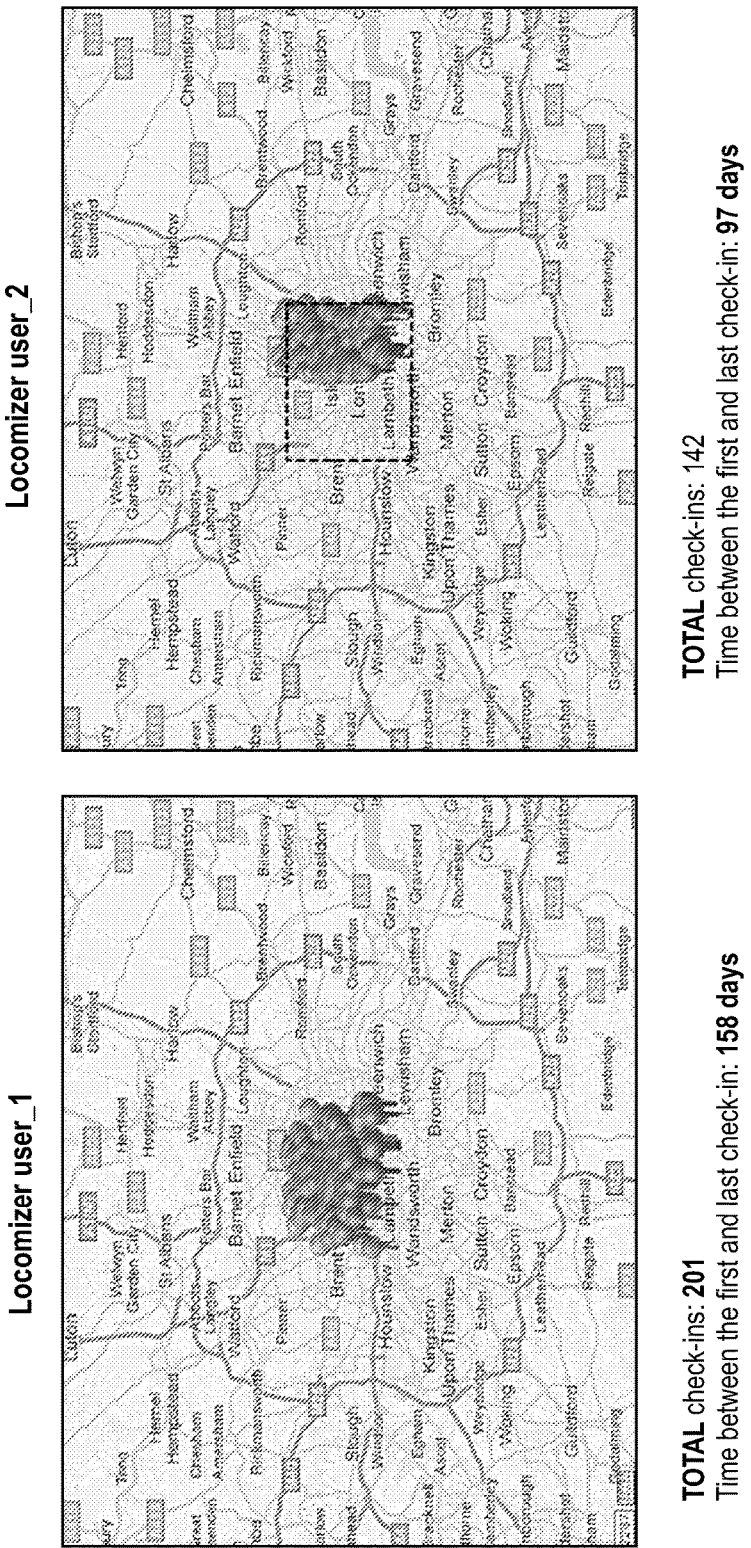

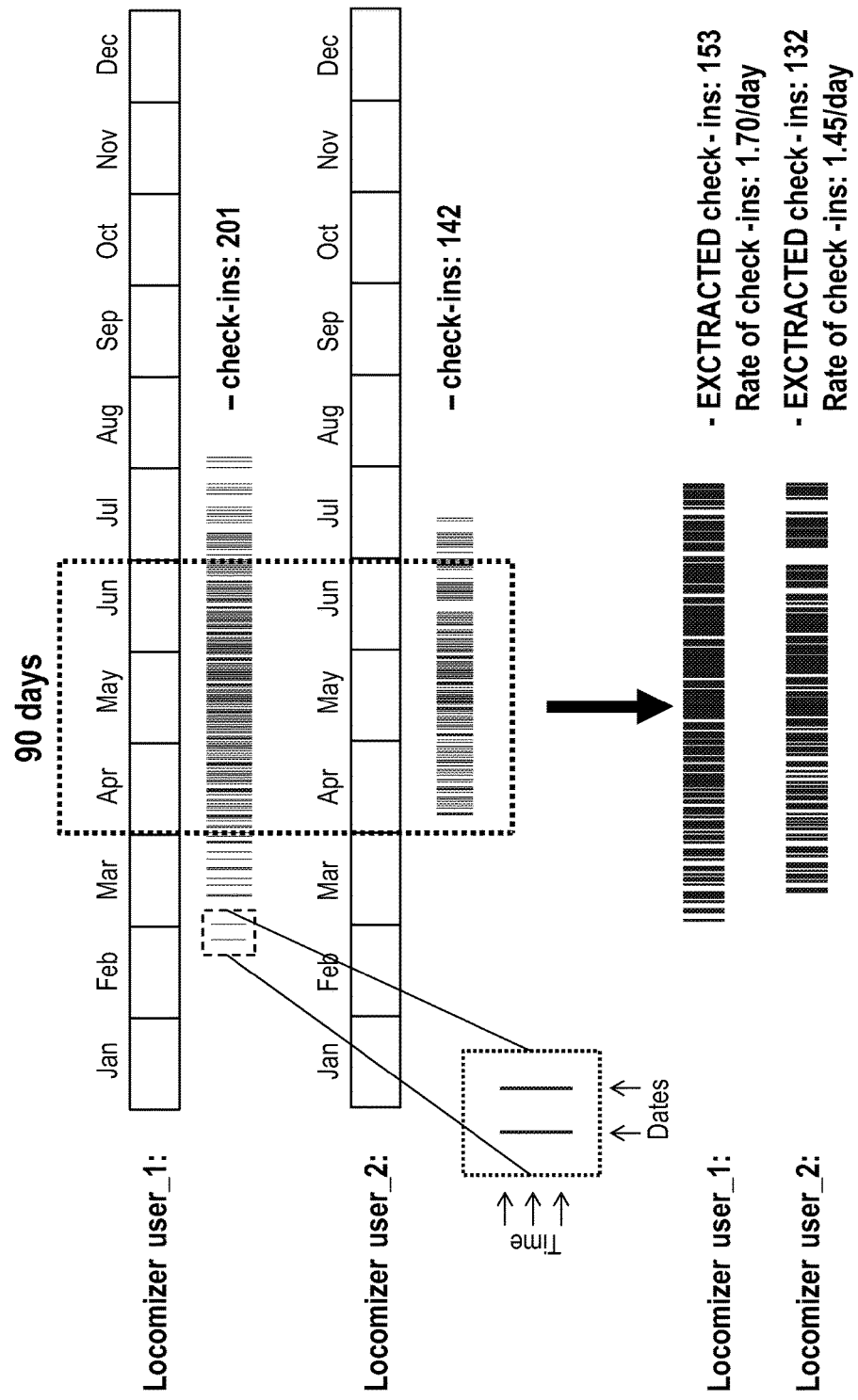

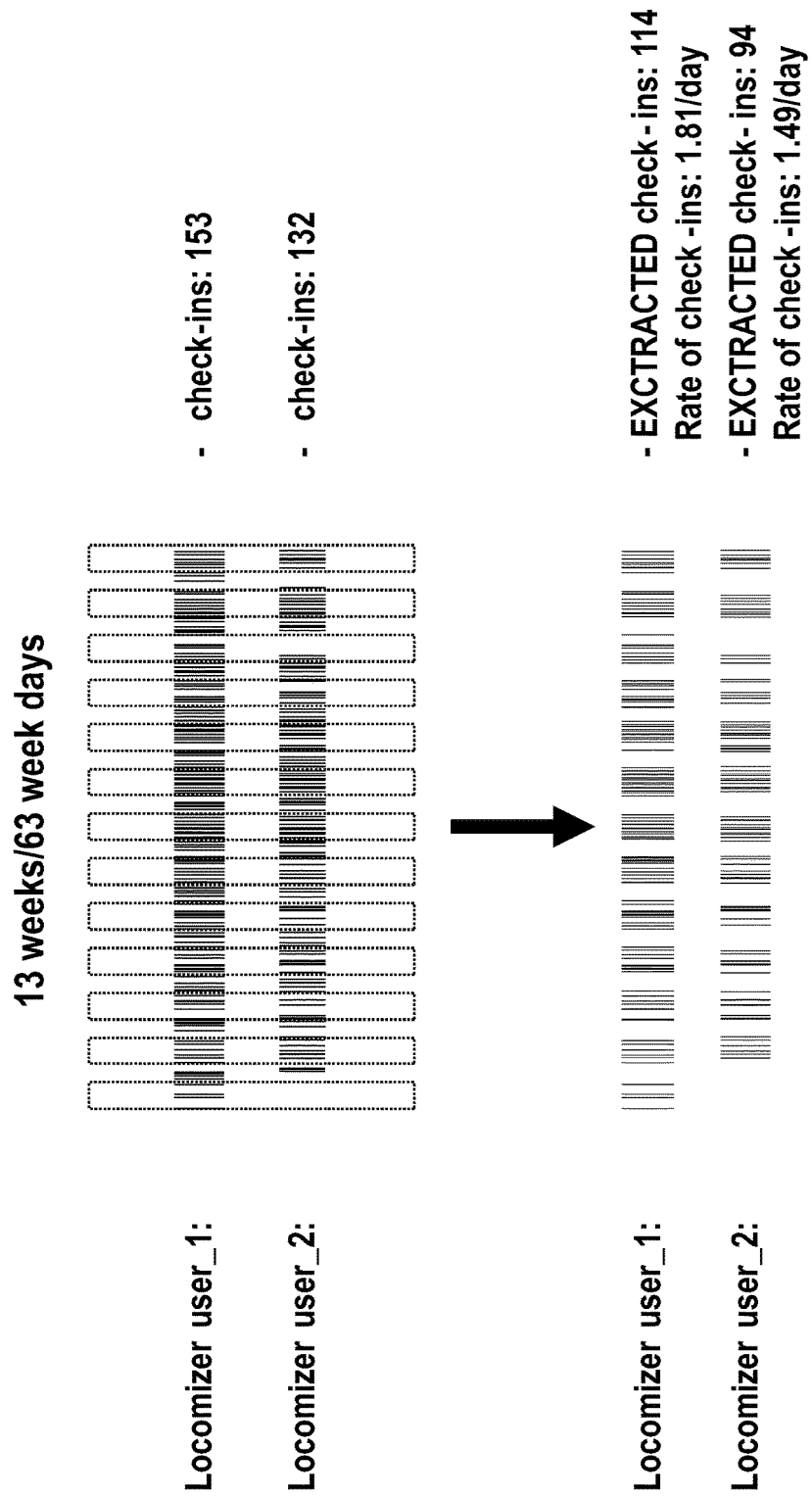
FIG. 6 Extracting check-ins for the selected day categories

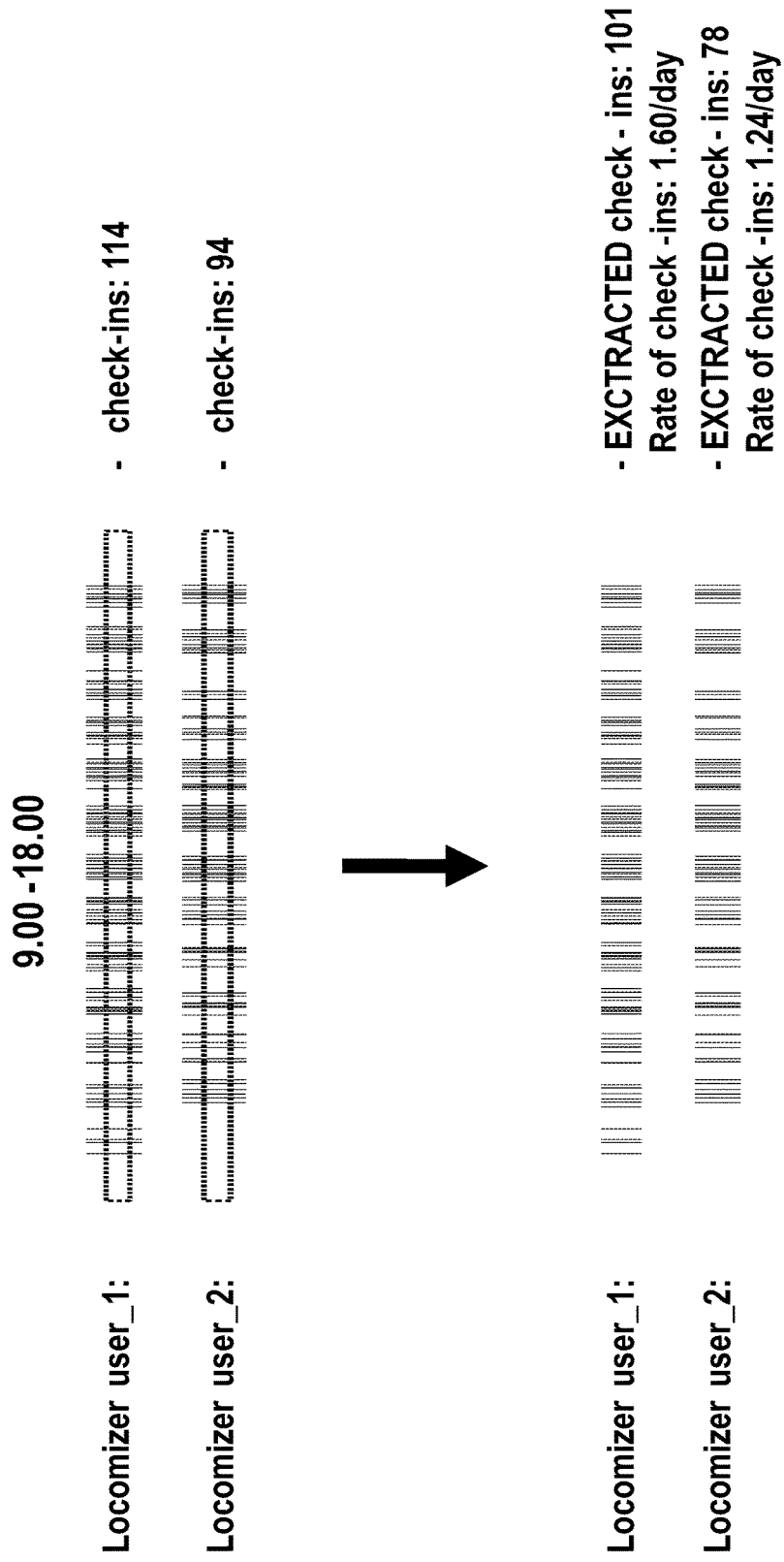
FIG. 7 Extracting check-ins for the selected time intervals

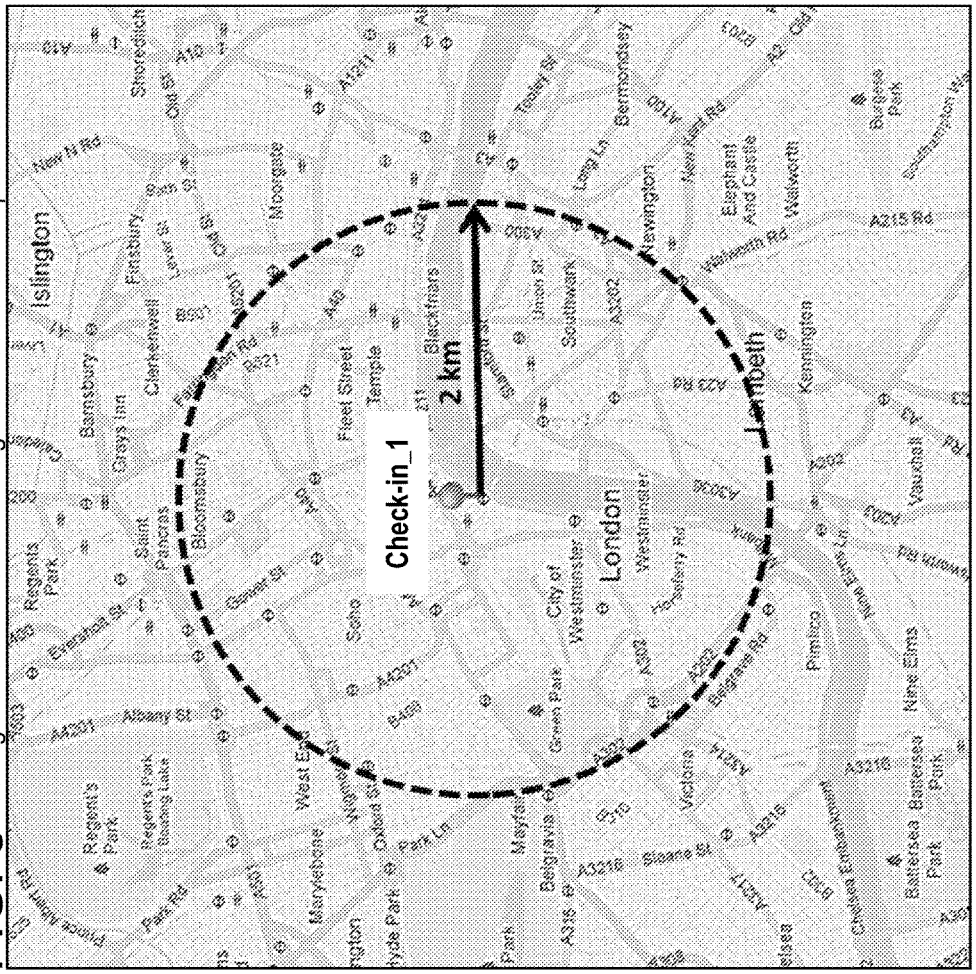
FIG. 8 Setting a size of the check-in neighbourhood area with public activities
Locomizer user_1:
Check-in_1

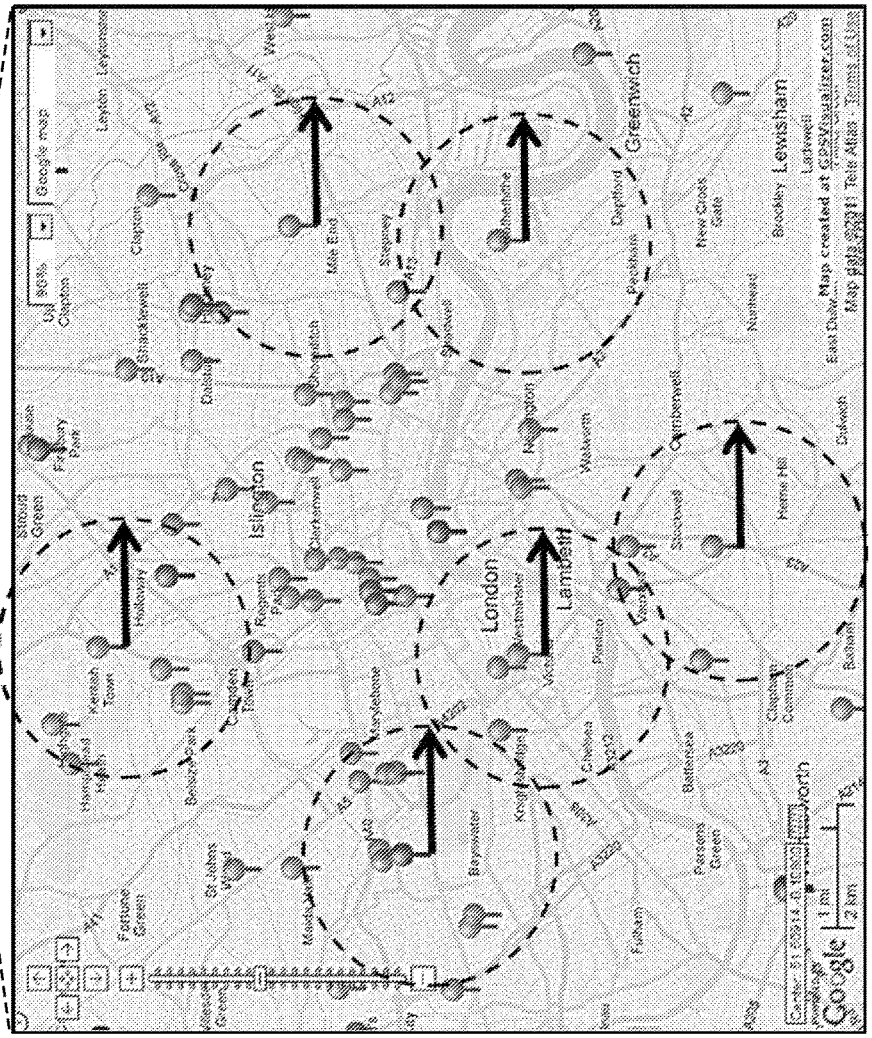
FIG. 9 Selecting neighbourhood areas with public activities for each check-in
--- The selected geographic area of check-ins
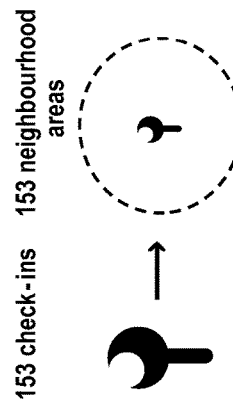
153 check-ins    153 neighbourhood areas

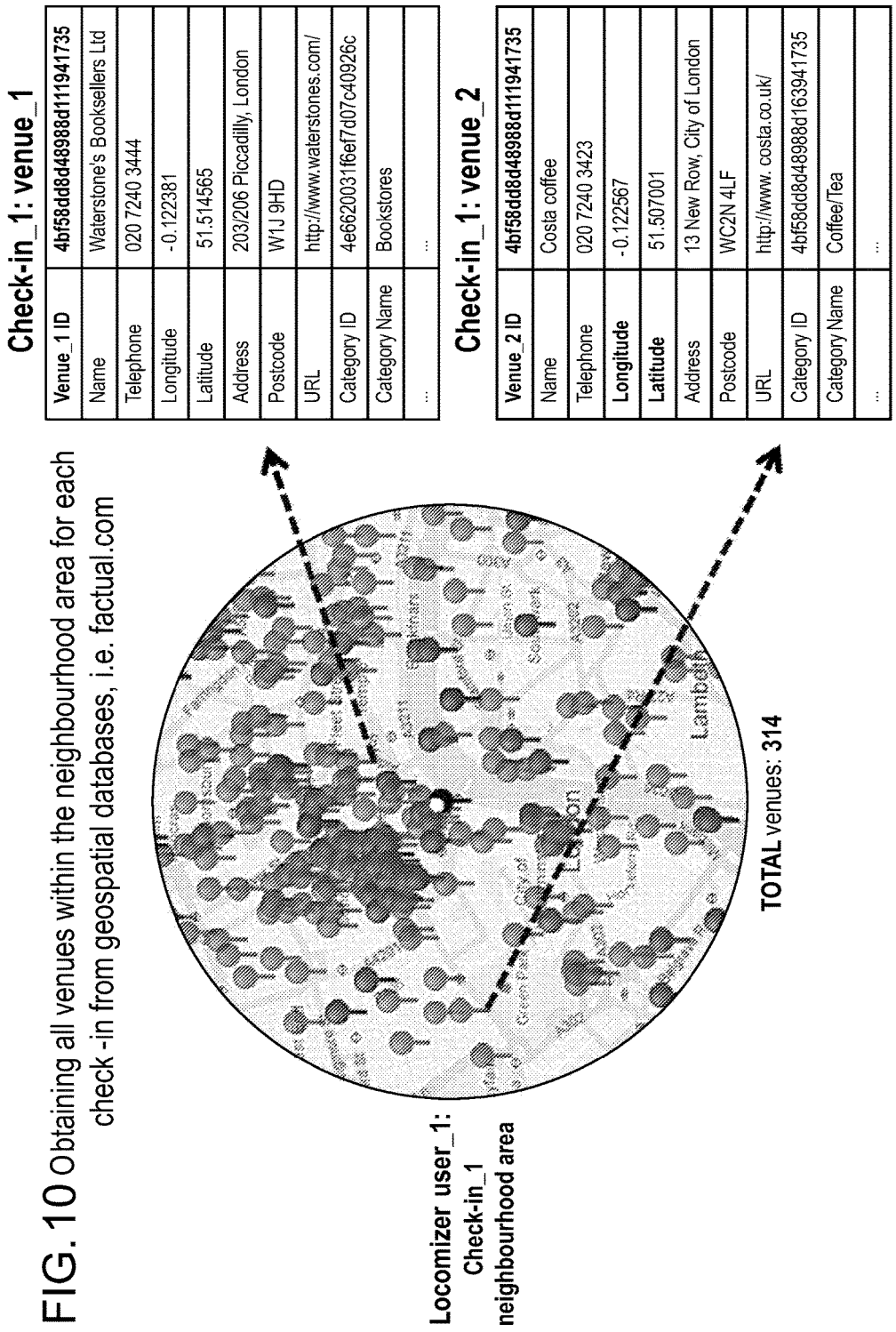
FIG. 10 Obtaining all venues within the neighbourhood area for each check-in from geospatial databases, i.e. factual.com

FIG. 11

Create the venue profiles in the locomizer venue database

Factual.com venue_1

| Venue_1 ID | 4bf58dd8d48988d111941735 |
|---|---|
| Name | Waterstone's Booksellers Ltd |
| Telephone | 020 7240 3444 |
| Longitude | -0.122381 |
| Latitude | 51.514565 |
| Address | 203/206 Piccadilly, London |
| Postcode | W1J 9HD |
| URL | http://www.waterstones.com/ |
| Category ID | 4e6620031f6ef7d07c40926c |
| Category Name | Bookstores |
| ... | |

Locomizer venue_1

| Venue_1 ID | dslkdlskllllllll222 |
|---|---|
| Name | Waterstone's Booksellers Ltd |
| Longitude | -0.122381 |
| Latitude | 51.514565 |
| Address | 203/206 Piccadilly, London |
| Postcode | W1J 9HD |
| Primary Category ID | 23847289347h |
| Primary Category Name | Shopping |
| Secondary category_1 ID | ieor44liiiiiidfdff |
| Secondary Category_1 Name | Bookstores |
| Secondary category_2 ID | xoweijdowie483 |
| Secondary category_2 Name | Coffee/Tea |
| Secondary category_3 ID | hdhiu5487jsn37 |
| Secondary category_3 Name | Snack spots |

Copied fields ⟶    Added fields ↓

Selecting the categorisation level of user interest profiles

FIG. 13 Sorting out activities at the level of Primary categories

FIG. 15 Categorising the activities in the check-in neighbourhood area into groups (Primary category level)

FIG. 16 Measuring the distances between the check-in_1 of locomizer user_1 and each activity in the category "Sport"

Selecting the sampling interval for aggregating activities with similar distances (Fig.16) into sampling groups

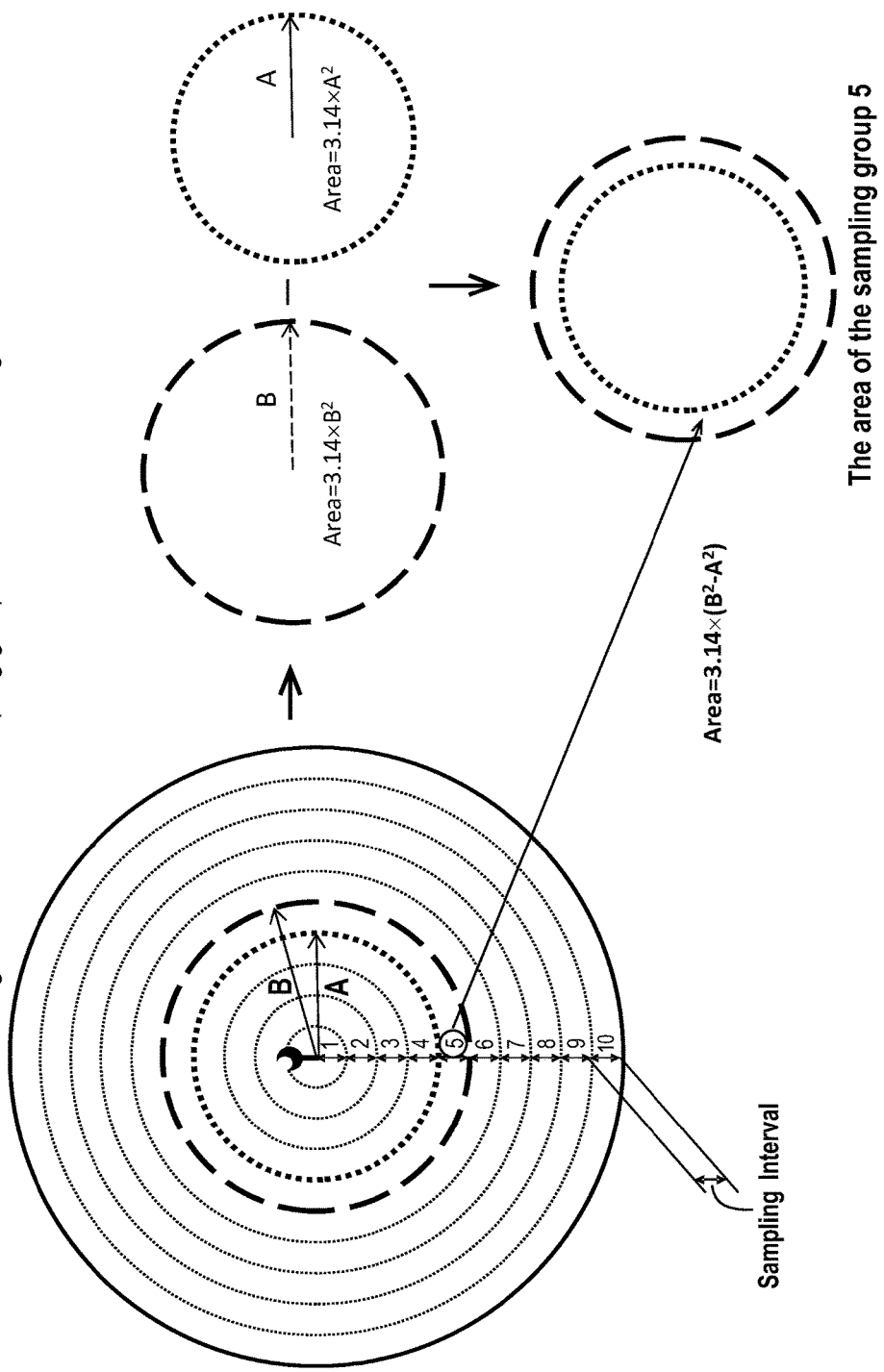
FIG. 18 Calculating the area of each sampling group in the check-in neighbourhood area FIG. 19 Calculating the probability of finding the activity "Sport" in each sampling group for the check-in_1

| | Sampling Group | 1 | 2 | 3 | 4 | 5 | 6 | 7 | 8 | 9 | 10 |
|---|---|---|---|---|---|---|---|---|---|---|---|
| Check-in 1 | Minimum distance from the check-in (A), units | 0 | 1 | 2 | 3 | 4 | 5 | 6 | 7 | 8 | 9 |
| | Maximum distance from the check-in (B), units | 1 | 2 | 3 | 4 | 5 | 6 | 7 | 8 | 9 | 10 |
| | Size of each sampling group (C), units | 1 | 3 | 5 | 7 | 9 | 11 | 13 | 15 | 17 | 19 |
| | Number of activities "Sport" per each sampling group (D) | 0 | 0 | 1 | 0 | 0 | 3 | 1 | 4 | 2 | 3 |
| | Density of activities "Sport" in each sampling group (E=D/C), units | 0.0 | 0.0 | 0.2 | 0 | 0 | 0.3 | 0.1 | 0.3 | 0.1 | 0.2 |
| | Total size of all sampling groups (F), units | 100 | | | | | | | | | |
| | Total number of activities "Sport" in all sampling groups (G) | 14 | | | | | | | | | |
| | Average density of activities in the check-in area (H=G/F), units | 0.14 | | | | | | | | | |
| | Probability to find an activity "Sport" in each sampling group (L=E/H) | 0.0 | 0.0 | 1.4 | 0.0 | 0.0 | 2.1 | 0.7 | 2.1 | 0.7 | 1.4 |
| | Natural logarithm of probability to find an activity "Sport" in each sampling group (P=lnL) | - | - | 0.3 | - | - | 0.7 | -0.4 | 0.7 | -0.4 | 0.3 |

Intermediate Record_3 in the Database

FIG. 20 Calculating the average probability of finding the activity "Sport" in each sampling group for N selected check-ins of locomizer user_1

| Check-in_1 | Sampling group Nº | 1 | 2 | 3 | 4 | 5 | 6 | 7 | 8 | 9 | 10 |
|---|---|---|---|---|---|---|---|---|---|---|---|
| | Natural logarithm of probability to find an activity "Sport" (P) | - | - | 0.3 | - | - | 0.7 | -0.4 | 0.7 | -0.4 | 0.3 |

+

| Check-in_2 | Sampling group Nº | 1 | 2 | 3 | 4 | 5 | 6 | 7 | 8 | 9 | 10 |
|---|---|---|---|---|---|---|---|---|---|---|---|
| | Natural logarithm of probability to find an activity "Sport" (P) | 2.0 | 0.3 | -1.6 | 3.9 | 1.5 | -1.9 | -0.8 | -1.6 | 0 | 0.3 |

+

| Check-in_N | Sampling group Nº | 1 | 2 | 3 | 4 | 5 | 6 | 7 | 8 | 9 | 10 |
|---|---|---|---|---|---|---|---|---|---|---|---|
| | Natural logarithm of probability to find an activity "Sport" (P) | 0.1 | 2.7 | 5.8 | 0 | -1.8 | -0.9 | 0 | 0.3 | 0.1 | -0.9 |

↓ Sum of P divide by N (P/N)

| Average Check-in | Sampling group Nº | 1 | 2 | 3 | 4 | 5 | 6 | 7 | 8 | 9 | 10 |
|---|---|---|---|---|---|---|---|---|---|---|---|
| | Average natural logarithm of probability to find an activity "Sport", <u>or interest score (I)</u> | 0.7 | 1.0 | 1.5 | 1.3 | -0.1 | -0.7 | -0.4 | -0.2 | -0.1 | -0.1 |

FIG. 21 Calculating the Total Interest score of the locomizer user_1 for the activity "Sport" within the selected interest area
| Sampling group N° | 1 | 2 | 3 | 4 | 5 | 6 | 7 | 8 | 9 | 10 |
|---|---|---|---|---|---|---|---|---|---|---|
| Average natural logarithm of probability to find an activity "Sport", or interest score (I) | 0.7 | 1.0 | 1.5 | 1.3 | -0.1 | -0.7 | -0.4 | -0.2 | -0.1 | -0.1 |
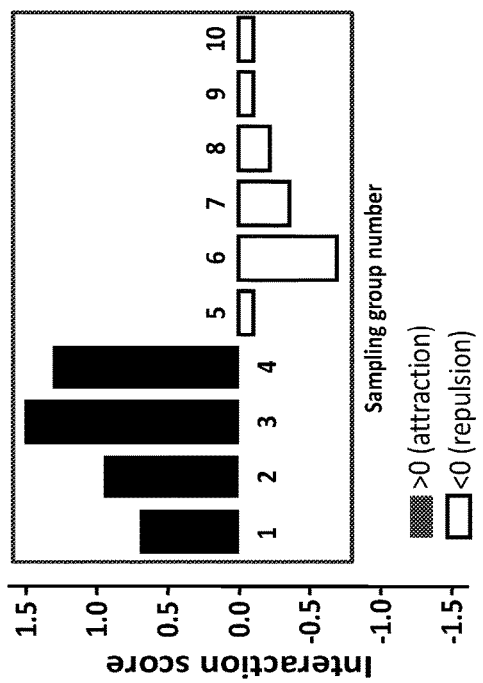

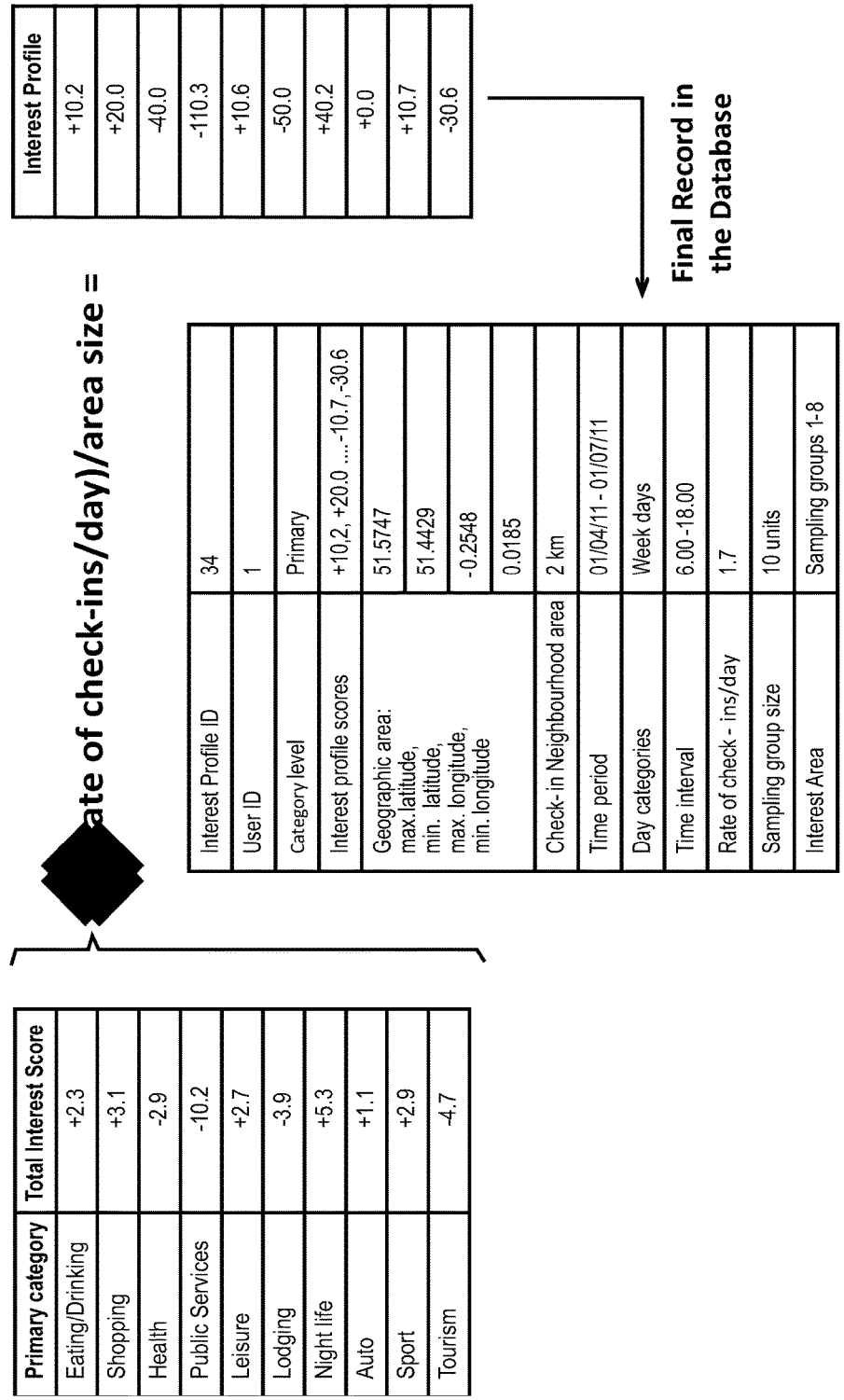
FIG. 22 Calculating the final normalized Interest Profile of locomizer user_1

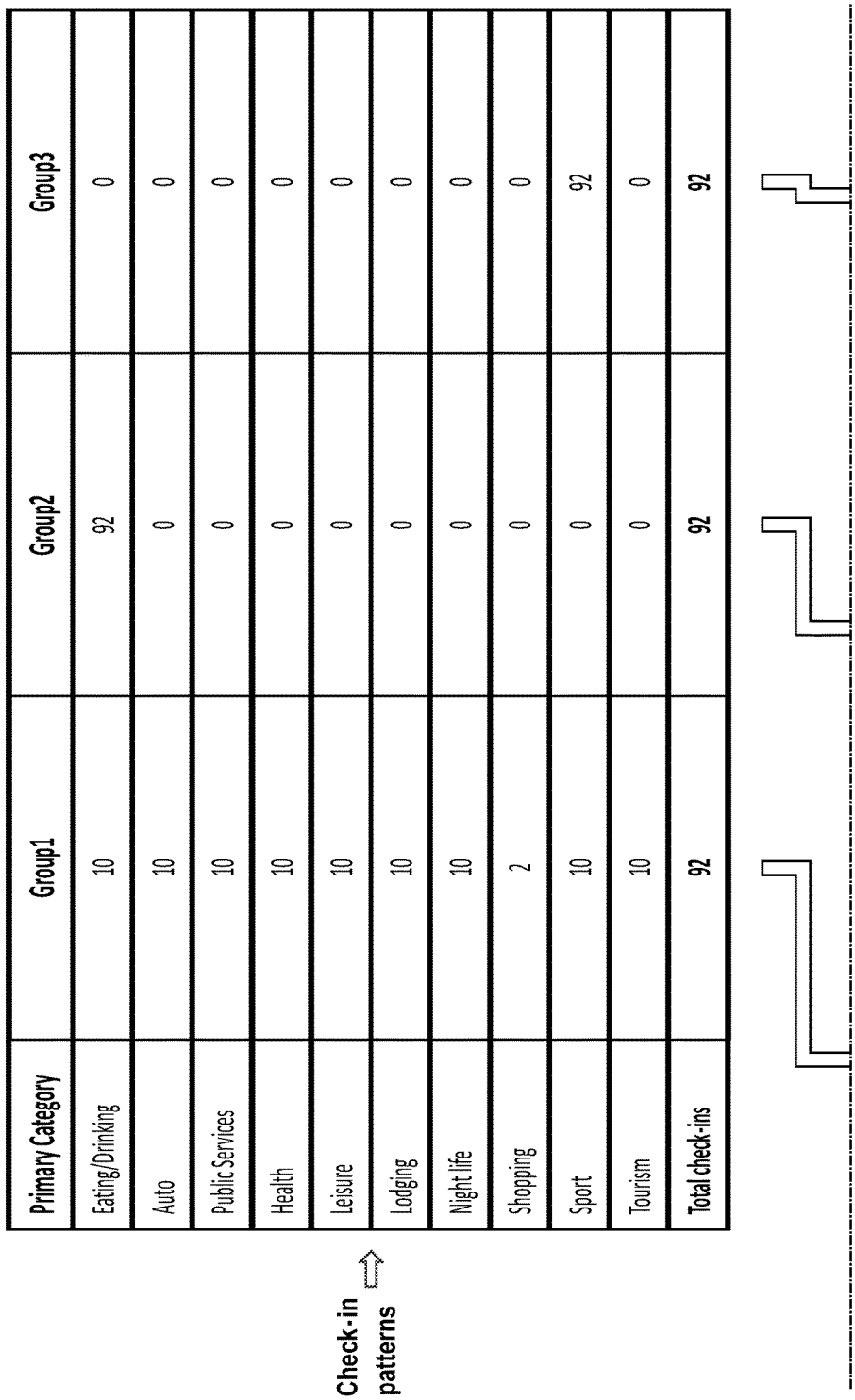
FIG. 23 Interest Profiles of users with different check-in patterns

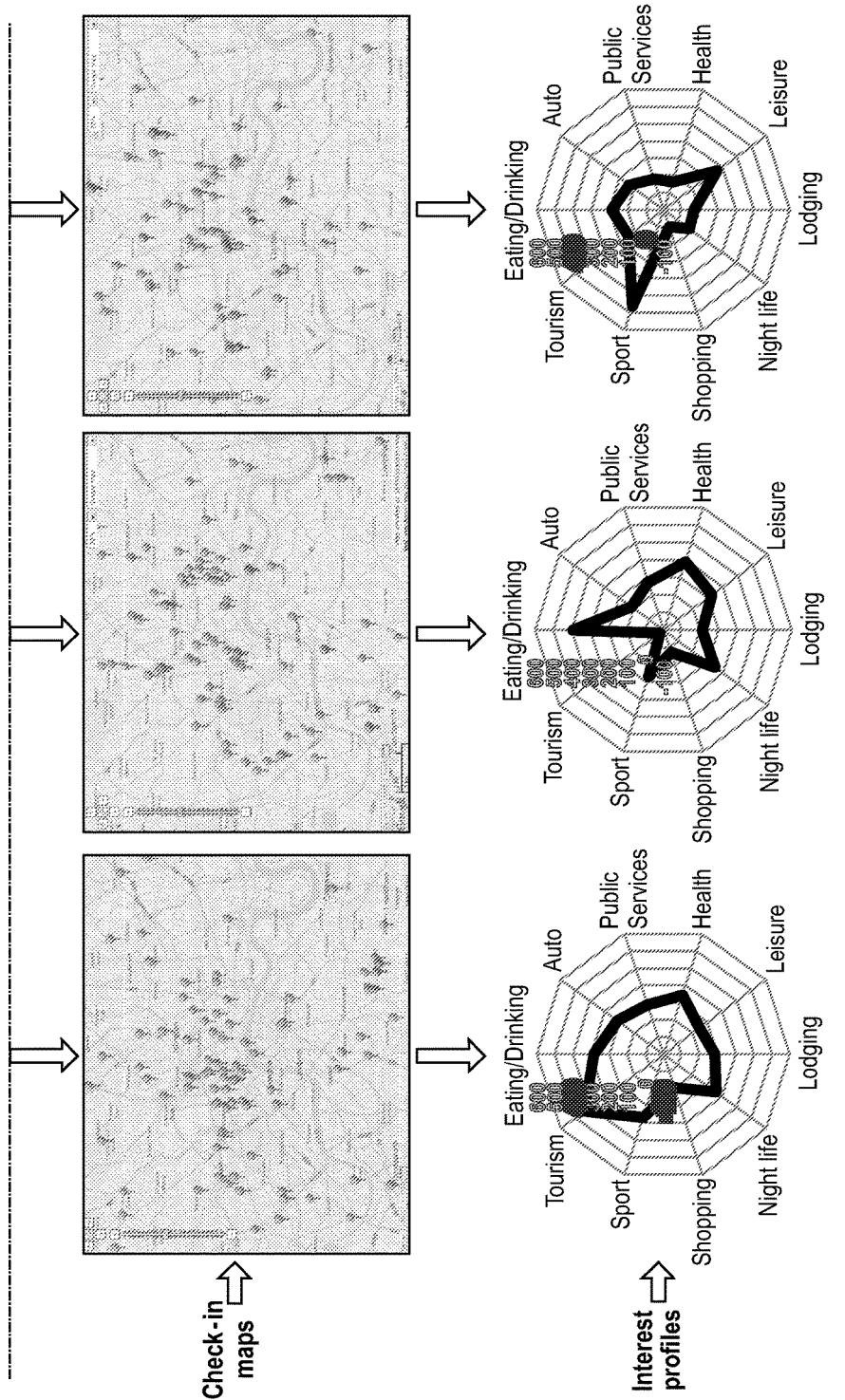
FIG. 23(contd)

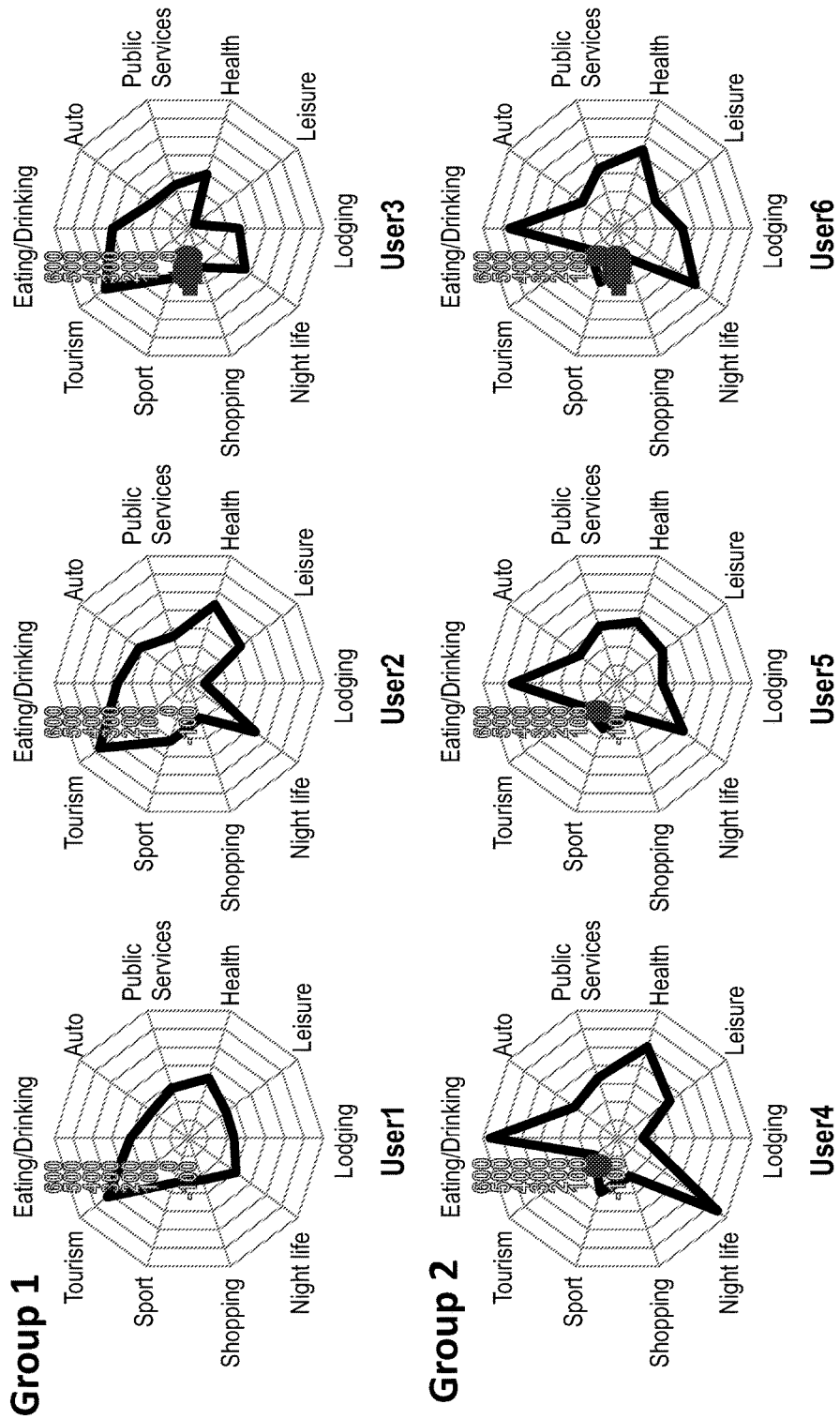
FIG. 24 Sample Interest Profiles from the Groups 1 and 2 (Figure 23)

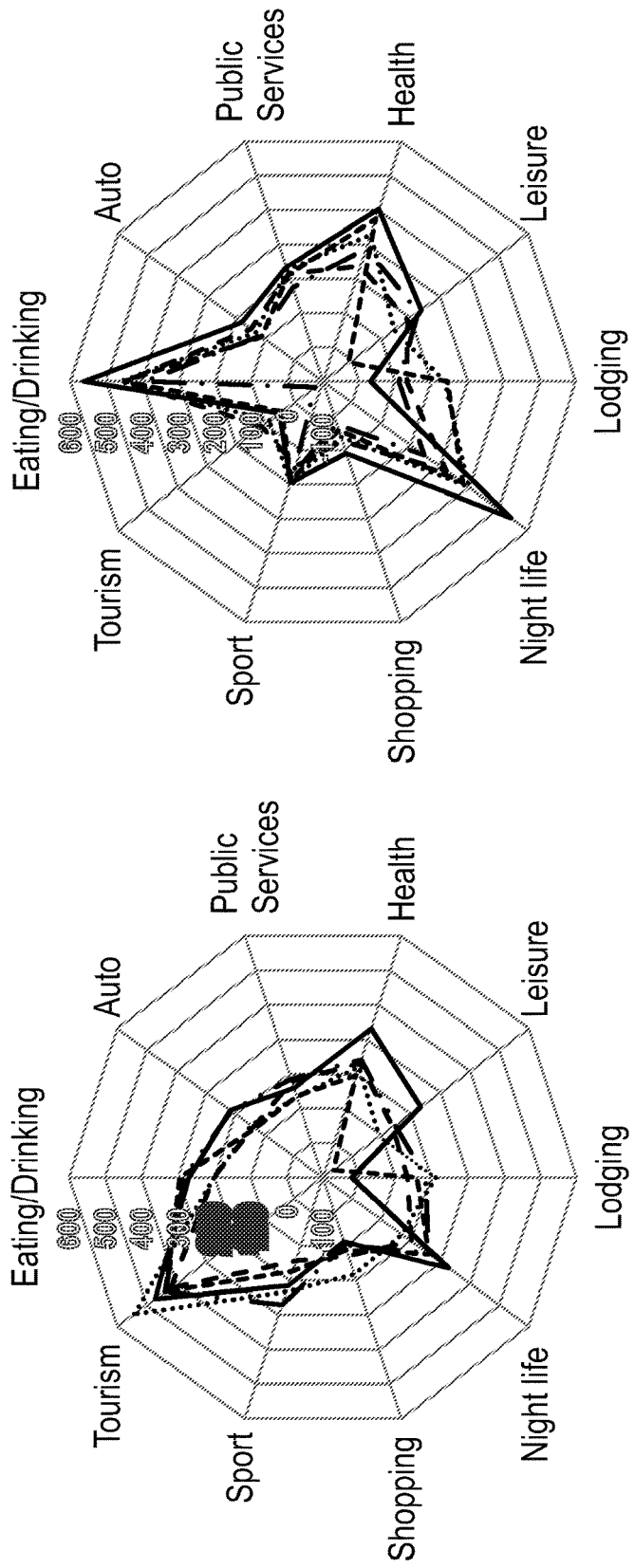
FIG. 25 Comparison of the Interest Profiles of users with different check-in patterns FIG. 27 Selecting the geographic area and type of places
The type of places – COSTA coffee shops
37 locations
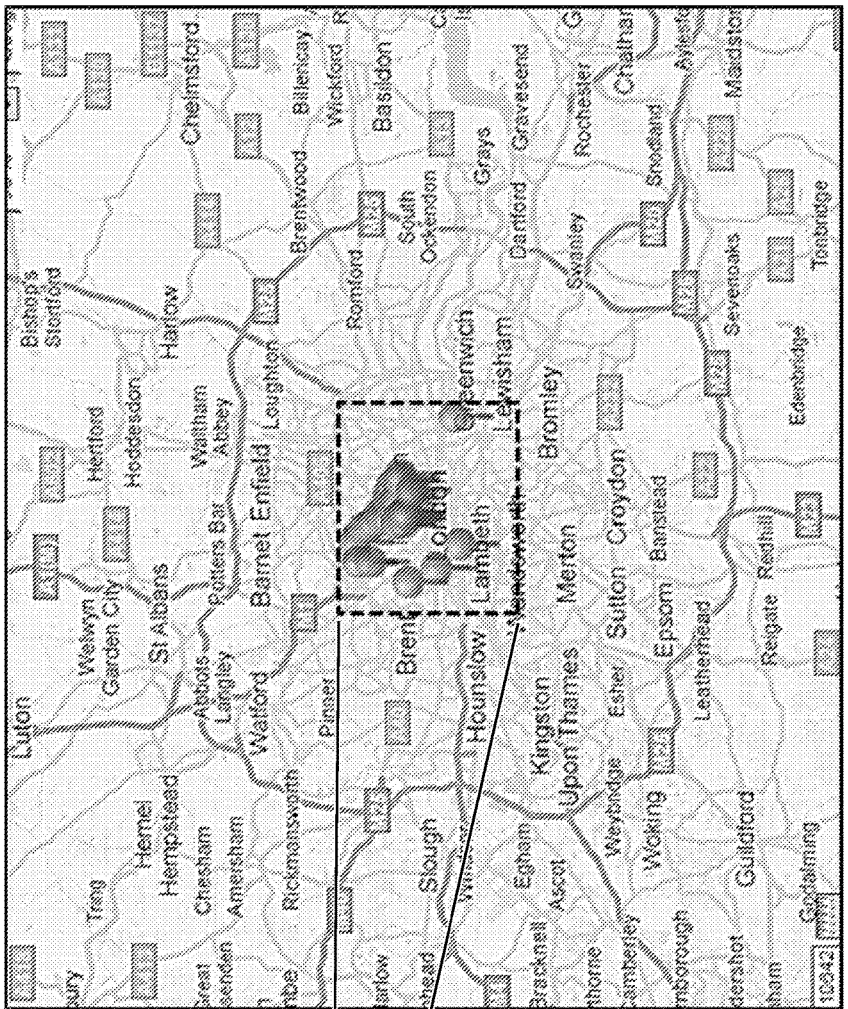
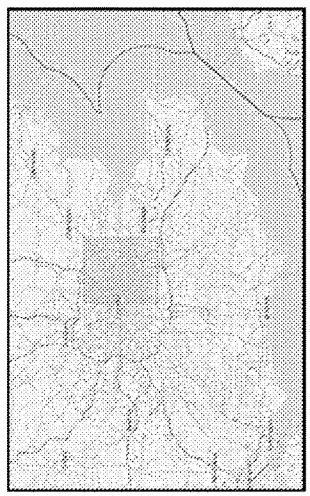
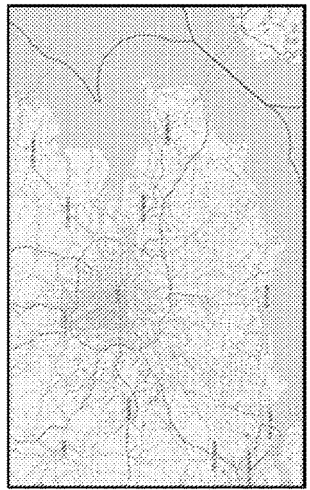

Defining the size of neighbourhood area with public activities

COSTA_1 location

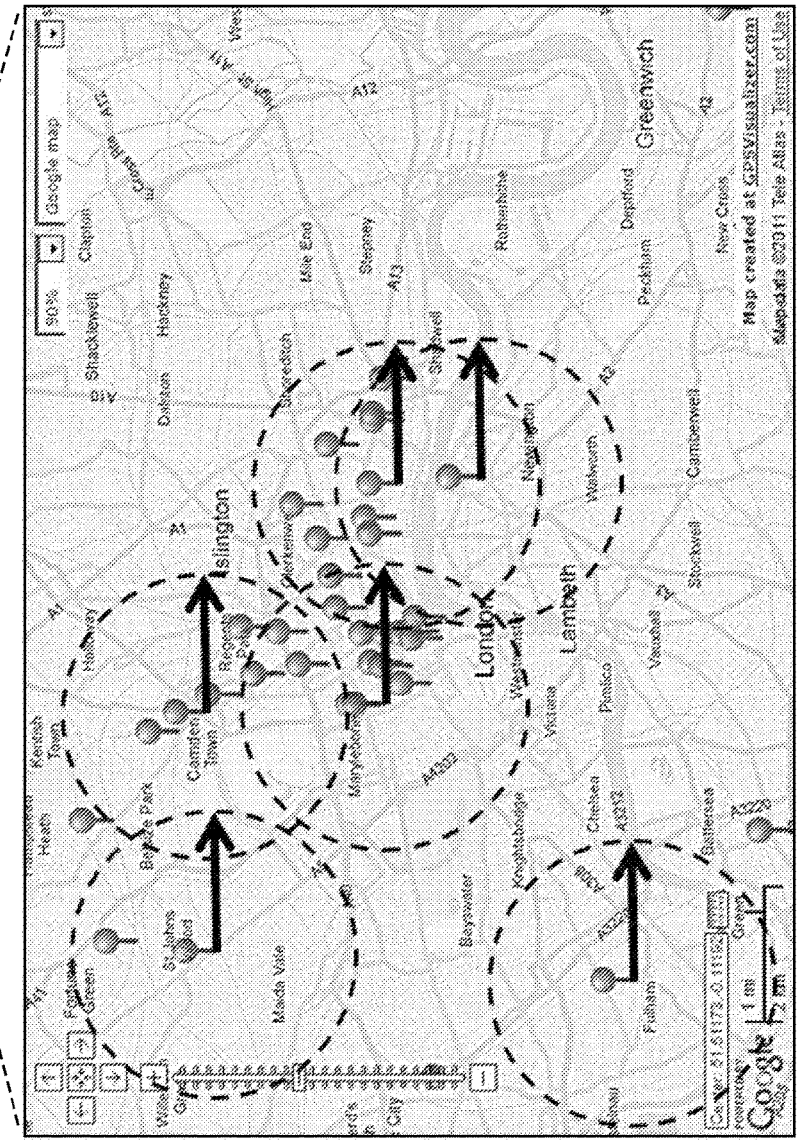
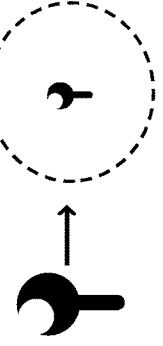
FIG. 29 Selecting the neighbourhood areas with public activities for each place

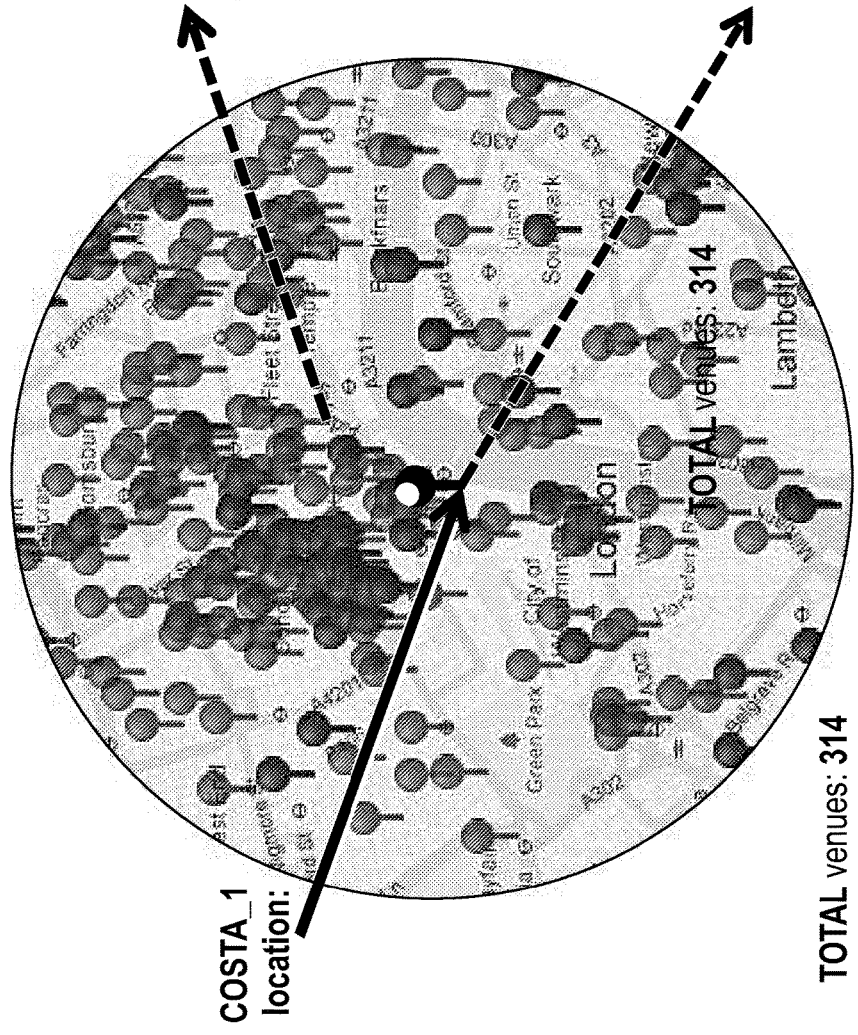
FIG. 30 Obtaining all venues within the neighbourhood area of each place from geospatial databases, i.e. factual.com

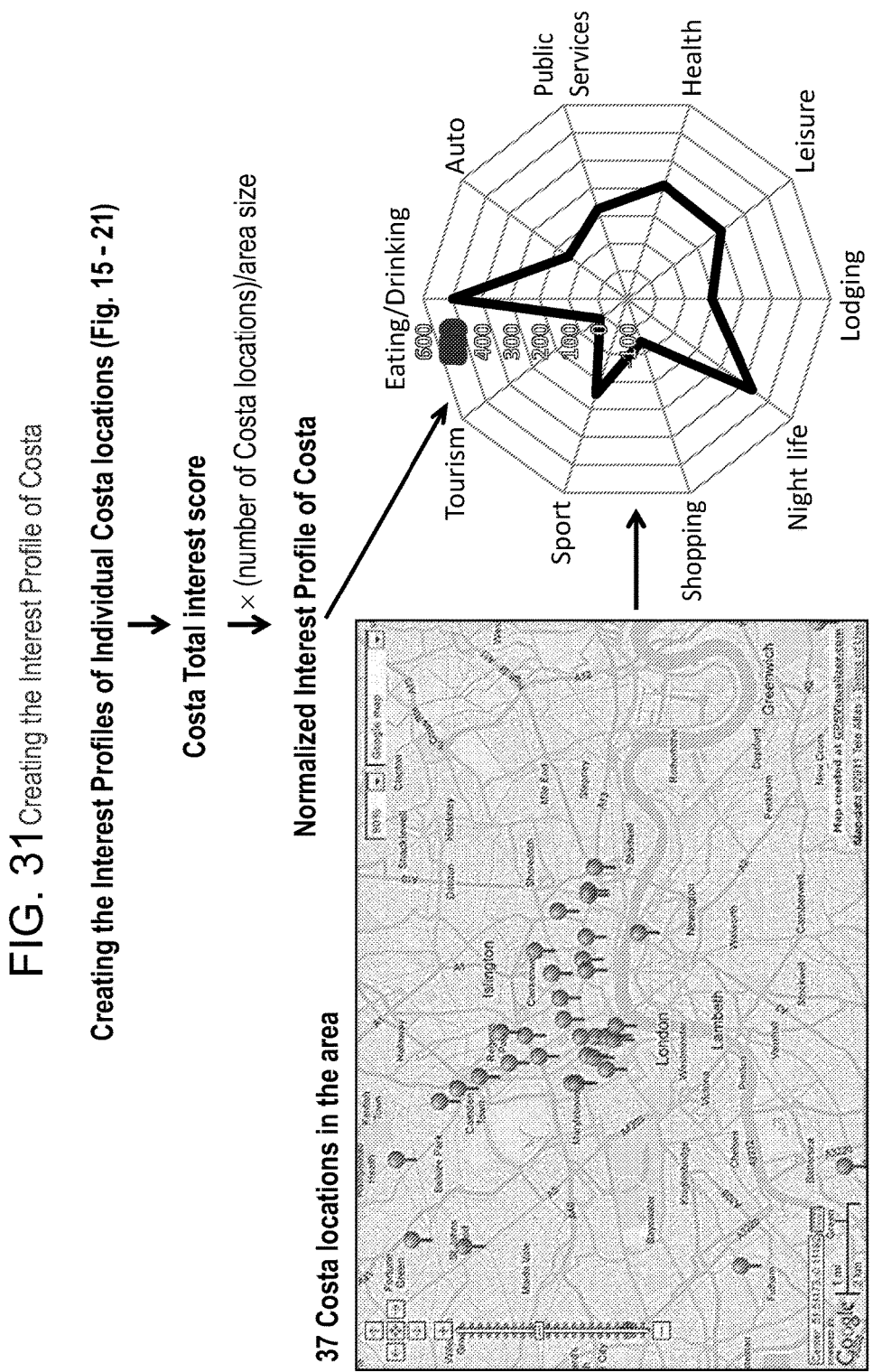
FIG. 31 Creating the Interest Profile of Costa

Creating the interest profile of groups of users

Individual Interest Profiles of users [1] to [N] (Fig. 15-22)

(Interest profile[1] + .... + interest profile[N])/N = Group Interest Profile [1+ ... +N]

FIG. 34 Categorisation of public activities content into the established taxonomy structure

| Primary categories (Tier 1) | | | | | | | Secondary categories (Tier 2) | | | | |
|---|---|---|---|---|---|---|---|---|---|---|---|
| Eating/drinking | Shopping | Auto | Public Services | Heath Care | Leisure | Lodging | Night Life | Sport | Tourism | | |
| American Cuisine | Antique Shops | ... | ... | ... | ... | ... | ... | ... | ... | | |
| Barbecues & Grilling | Arts & Craft Stores | ... | ... | ... | ... | ... | ... | ... | ... | | |
| Cajun/Creole | ... | ... | ... | ... | ... | ... | ... | ... | ... | | |
| Chinese Cuisine | Bike Shops | ... | ... | ... | ... | ... | ... | ... | ... | | |
| Cocktails/Beer | Bookstores | ... | ... | ... | ... | ... | ... | ... | ... | | |
| Coffee/Tea | ... | ... | ... | ... | ... | ... | ... | ... | ... | | |
| Cuisine - Specific | Clothing Shops | ... | ... | ... | ... | ... | ... | ... | ... | | |
| Desserts & Baking | Department Stores | ... | ... | ... | ... | ... | ... | ... | ... | | |
| Dining out | Furniture and Home stores | ... | ... | ... | ... | ... | ... | ... | ... | | |
| French Cuisine | ... | ... | ... | ... | ... | ... | ... | ... | ... | | |
| Health/Low Fat Cooking | Music Stores | ... | ... | ... | ... | ... | ... | ... | ... | | |
| Italian Cuisine | Service Shops | ... | ... | ... | ... | ... | ... | ... | ... | | |
| Japanese Cuisine | ... | ... | ... | ... | ... | ... | ... | ... | ... | | |
| Vegetarian | ... | ... | ... | ... | ... | ... | ... | ... | ... | | | ized recommendations, more constructive social networking
INTEREST PROFILE OF A USER OF A MOBILE APPLICATION

CROSS REFERENCE TO RELATED APPLICATIONS

This application is the National Phase of PCT International Application No. PCT/GB2013/051475, filed on Jun. 3, 2013, which claims priority under 35 U.S.C. 119(e) to U.S. Provisional Application No. 61/654,716, filed on Jun. 1, 2012, all of which are hereby expressly incorporated by reference into the present application.

FIELD OF THE DISCLOSURE

The methods and devices of the present invention broadly relate to computer-based methods for generating an interest profile for a user.

BACKGROUND

As we move deeper into the 21st century, global expansion of organizations, continuing growth of large cities and disappearance of small cities and communities become faster and greater in scale. One of the consequences of globalization is that communication between single individuals, groups of individuals and organizations become less and less personalized. Furthermore, the globalized world creates problems for individuals and organizations to identify themselves in a host of available options, outline the scope of their interests and associate themselves with appropriate individuals and organizations. There is a growing need for personalization in communication and work. One reflection of this need is a rapid growth of internet-based social networking and its use for targeted advertising and recommendations.

The Internet is a powerful tool for social networking. It helps people form groups centred on social connections between individuals who know each other, which in the past might be held only within the confines of social or organizational settings, such as family, school, community center, private club, or the like. The Internet is also one of the most popular sources for obtaining and sharing information.

One popular activity associated with the Internet is communication between people, and notably people who may be separated by vast distances. Some familiar technologies that facilitate communication and involve the Internet include email, bulletin boards, virtual chat rooms, blogs, instant message systems, Internet-based social communications facilities, and the like. This set of technologies, and those that are similar, are characterized by being substantially solely on-line.

In other words, the foregoing set of well-known Internet related applications supports geographically distributed communications, and does not have anything further as their objective.

In spite of the increased ability to communicate online, many people are still interested in meeting together in person with other people who are interested in the same topic, event, and the like. Further, there is a huge need to have knowledge of "true" interests of people locally within geographical areas to achieve more effective target-oriented distribution of goods and recommendations, rational planning and efficient performance of community services, successful arrangement of urban events and developments, which would reflect the interests and needs of local individuals. None of the existing internet-based systems are fully suitable to satisfy this need and solve the latter problems.

The Internet based social networks have been used for targeted advertising by different commercial and non-commercial organizations. However, the poorly defined interest groups and lack of tips to concrete local socio-geographical environment of the user decrease efficiency of the social networks-based targeted advertising.

The Internet also provides some location-based websites based on hardware for mobile devices. These websites, such as Foursquare, typically allow connecting registered users with friends and update their location: the users who "check-in" at venues can chose to have their check-ins posted on their accounts or on other websites, such as Twitter, Facebook, or both. Users can create a "To Do" list for their private use and add "Tips" to venues that other users can read. These may serve as suggestions for real-world local gatherings and indications of interests of the user. However, it cannot give any real tips concerning the real scope of interests of the user. Therefore, there is no opportunity for a stranger, who can read one's "To Do" list, to find out whether gatherings at the "Tipped" venues would really bring him together with individuals of a similar range of interests, and there is no chance for an advertising company to identify the target user correctly.

SUMMARY OF THE DISCLOSURE

The present invention is defined in the appendant claims.

A method and system consistent with the present invention broadly relates to computer-based methods for creating a profile of a user of one or more mobile applications which defines the scope of the user's interests, e.g. interests relating to life style, social networking, etc., wherein said method comprises a step of describing interaction of the user with one or more activities associated with one or more locations (e.g. venues) located within a selected geographical area during a defined period of time. The method and system of the invention may be used, for example for the targeted advertising, personalized recommendations, matching of people, Internet-based social networking and organizing real-world gathering of individual users of mobile applications, etc.

The present invention relates to methods for creating a profile of a user of a mobile application, wherein said profile comprises information about the scope of interests of the user (the term "interest" in the present context means one or more of: (i) activities that the user enjoys doing or subjects that the user likes to spend time learning about and the like (further referred as "positive interest"); (ii) activities or subjects that the user is indifferent to (further referred as "zero interest"); and (iii) activities or subjects that the user keeps away from, i.e. avoids doing or spending time learning about (further referred as "negative interest"). The user's scope of interests is determined according to the invention by analyzing interaction of the user with one or more activities associated with one or more venues located within a selected geographical area during a defined period of time. The activities may be so-called "public activities", e.g. activities which are accessible to a number of individuals, and the venues may be "public venues", e.g. venues accessible to a number of individuals. The invention addresses and solves the above discussed problems of the field, namely more precise targeted advertising, more accurate personalized recommendations, more constructive social networking and real-world gatherings, etc. This may be achieved by providing a database of interest profiles of registered users of one or more mobile applications.

The methods of the invention are characterized in that they combine (1) the redoubtable communication capabilities of the Internet, (2) capabilities of mobile applications to register the precise time and location of a user of a mobile device, and (3) a detailed analysis of interaction of registered users of one or more mobile applications with one or more activities associated with one or more venues within a selected geographical area during a defined period of time ("interaction of the user with activities associated with one or more venues located within a selected geographical area during a defined period of time" is also termed herein as a "socio-geographical behaviour of the user").

In particular, the invention relates to methods for generating the interest profile of an individual who is the registered user of one or more mobile applications that are capable of, or that are linked to a facility that is capable of receiving and storing information about (i) the registered user ID, (ii) geographical coordinates of a venue the user checks-in to said mobile application(s) or to said facility, and (iii) time point when the check-in is taking place. This information may be check-in data which can be transmitted via the mobile application to a check-in service for processing according to the methods of the invention defined below. In addition, the invention relates to methods for generating the interest profile of a public venue associated with at least one public activity.

Methods of the invention may comprise in different embodiments all or some of the following steps:
1. obtaining information about a registered user of one or more mobile applications from one or more databases linked to said mobile applications, wherein said information may comprise data (i), (ii) and/or (iii) (as above), wherein said data relate to a selected geographical area and a defined period of time
2. analyzing the data of (1), identifying activities associated with (1) and with venue(s) within the neighborhood area of (1), and categorizing said venues with regard to activity(ies) associated with thereof
3. analyzing interaction of the registered user with the activities of (2)
4. generating an interest profile of the registered user, wherein said interest profile comprises a description of the user's relation to activities associated with the venues of (2)
5. obtaining information about a venue of interest located within a selected geographical area from one or more geo-spatial databases
6. analyzing the information or data of (5) comprising identifying activities associated with (5) and with venue(s) within the neighborhood area of (5), and categorizing said venues with regard to activity(ies) associated with thereof
7. analyzing interaction of the venue of interest of (5) with the activities of the venues of (6)
8. generating an interest profile of the venue of interest of (5), wherein said profile comprises a description of the venue's relation to the activities associated with the venues of (6).

Different aspects and embodiments of methods of the invention are discussed below.

The term "mobile application" is used herein to describe an application that runs on or is executable on an electronic device, such as a smartphone, tablet or another portable mobile device. The invention relates to mobile applications that are executable: to identify the geographical position of a user, e.g. they can help users identify their geographical position, to store this information on an internal or external memory module, and to connect the device and user to Internet services more commonly accessed on desktop and notebook computers, or help them by making it easier to use the Internet on their portable mobile devices. A mobile application may, for example, be a mobile website bookmarking utility, photo-sharing website, mobile-based instant messaging client, location-based shopping, games, navigation and many other applications, e.g. Google wallet. In one preferred embodiment, a mobile application of the invention is a location-based application, such as a website based on or accessible via hardware for mobile devices that can register and store information about a user's interaction with one or more activities within a geographical area during a period of time and communicate this information on request. One non-limited example of a type of mobile application suitable for use with the present invention is Foursquare.

The term "registered user of a mobile application" (termed thereafter as "registered user" or "user") means that the user has a profile registered within or by said mobile application and stored in the device, wherein said profile comprises information which may comprise one or more of: (i) the user's user name, and, optionally, (ii) the user's home address, and/or (iii) one or more user biometric data (the term "biometric data" is used to refer to data that is created during a biometric process. This includes samples, models, fingerprints, similarity scores and all verification or identification data excluding the individual's name and demographics).

The term "venue" in the present context means a place within a selected or predefined geographical area, which place is associated with one or more activities. The term "associated" is the present context means that the place is used by one or more individuals for doing or performing one or another category of activities (e.g. a category of activities discussed below). The venue may be a public venue and the activity may be a public activity. The term "public" is used herein to describe places in a geographical area and/or human activities relating to or involving people in general, rather than being limited to a particular individual or a narrow group of individuals, e.g. a family. However, privately owned venues that are open for doing one or another category of public activity(ies) described herein (see discussion below) by general public or by a particular group of individuals are also regarded as "public".

In one embodiment a venue of the invention may be a place which has well-defined physical boundaries and a postal address (e.g. a building in a town) in another embodiment, a venue may be a place that can be identified by geographic coordinates, although it may not have well-defined physical boundaries and/or a postal address, i.e. it may be a place identifiable by the latitude and longitude coordinates, e.g. a street corner, a boat on a lake.

The term "selected geographical area" refers in the present content to a geographical area of any size that may be randomly or purposely selected for analysis of interaction of one (or more) registered user(s) of one (or more) mobile application(s) with activities associated with at least one venue located within this geographical area.

The term "public activity" refers to a variety of human activities that are open to the general public, such as physical and social activities involving people in general, rather than being limited to a single individual or a particular group of people, such as e.g. activities including practicing sport, shopping, eating, drinking or clubbing at public venues etc., but not privately held arrangements, e.g. receptions, parties or the like, intended for a selected group of individuals.

Exemplary, but not limiting, public activities associated with public venues of the invention may be selected from eating/drinking activities at venues such as restaurants and cafes or the likesport activities at venues such as stadiums, swimming halls, fitness centers, public gardens, and the likeuse of health-related services at venues such as optician shops, pharmacies, rehabilitation centers, and the likeshopping at venues such as malls, specialized boutiques, department stores, flea markets and the likenight life activities at venues such as night clubs, discotheques, night bars and the liketourism related activities at venues such as museums, exhibitions, amusement parks, sightseeing buses and boats, book stores, tourist offices, tourist agencies and the likeeducation related activities at venues such as museums, exhibitions, libraries, evening schools, educational centers, sightseeing buses and boats, book stores and the likeentertainment related activities at venues such as museums, exhibitions, amusement parks, concert halls, theaters, public gardens, and the like, etc.

One aspect of the invention relates to the categorizing of public venues with regard to public activities associated with thereof and, sequentially, creating an "activity profile" of said public venue, wherein the activity profile describes all activities that are or were associated with that public venue, i.e. present at the venue during a defined period of time. The term "category" in the present context means a type or a group of public activities having some features that are the same which are defined in a system for dividing things according to content, quality, appearance, etc.

According to the invention, categories of public activities may be defined for every particular embodiment of the invention following tailor-made rules, i.e. defined by criteria that suits only (or best for) a particular embodiment. The categories may also be defined by using common well-accepted systems for categorizing public activities. For example, in some embodiments, public activities may be categorized according to standards and rules developed by governmental organizations, e.g. such as categories of the UK Local Government Business Category List (version 1.00) (http://www.esd.org.uk/standards/lgbcl/), or North America Industry Classification System (NAICS) or the like.

In other embodiments, public activities of the invention may be categorized according to classification developed by commercial providers of data on geographical location of different features ranging from tourist attractions, businesses, public buildings, service provision, retail outlets and leisure facilities to landscape features that people may wish to visit or know the location of. These can be grouped into features that typically have an address as is the case for shops, schools, hotels and restaurants and those that are typically non addressable as are lakes, car parks, telephone boxes, cattle grids, public toilets and letter boxes. Each feature is classified and allocated a geocode allowing users to know "what is where". Non-limited examples of such providers may be PointX (http://www.pointx.co.uk/index.htm).

In other embodiments, public activities of the invention may be put into different categories according to rules commonly used in the field of commercial advertizing, e.g. the rules developed by the Interactive Advertising Bureau (IAB) (http://www.iab.net/about_the_iab) or the like.

Non-limiting embodiments of categorization of public activities for the purposes of the invention are described below.

One aspect of the invention relates to describing interaction of a registered user of one or more mobile applications with one or more public activities associated with at least one public venue within a selected geographical area during a defined period of time (or socio-geographical behavior of the user). The term "interaction" in the present context means that the user and/or their electronic communication device was at least once registered as physically present or absent within the neighborhood or geographical area of a public venue of the invention associated with the public activity(ies) during a defined period of time.

The physical presence or absence of a user at a venue is registered according to the invention as a registration of the user's geographical position at a mobile application that is linked to the user's mobile device. The registration may be in the form of a registered GPS or assisted-GPS signal originating from the user's mobile device while the user is at the venue or a registered user may "log-in" or "check-in" at a location-based website or application, based on hardware for mobile devices (including their own electronic communication device) that can register the geographical coordinates of the user while he/she doing his/her "check-in" to the website, and time point of the "check-in" or "log-in", or the like. One example of such location-based website may be Foursquare.

The geographical position is determined and used to generate location data which can form part of the check-in data mentioned above.

The geographical position may be determined utilising one or more mobile device location based services (LBS), such as cellular base-station triangulation, satellite positioning or combination of the two.

According to the invention, interactions of the user with public activities associated with public venues located within a selected geographical area may be classified into positive interactions, zero interactions, and negative interactions, wherein a positive interaction means that the user has higher than a random chance to be present within an "interest area" of a venue associated with the public activity(ies) during a defined period of time (the term "interest area" means a nearby area within a defined distance from the venue, which could be equal or smaller than the size of the neighborhood area), and wherein a zero interaction means that the user has a random chance to be present within an interest area of a venue associated with the public activity(ies) during the same period of time, and wherein a negative interactions means that the user has lower than a random chance to be present within an "interest area" of a venue associated with the public activity(ies) during the same period of time.

An interaction of a user with an activity according to the invention may be further evaluated with regard to weighting up the probability of the user's presence within the interest area of a venue associated with the public activity(ies) during a defined period of time against the probability of the user's presence within the interest area of the venue associated with the activity(ies) during a defined period of time expected by a random chance. The numerical natural logarithmic scale can be used to convert the ratio between the observed probability and the probability expected by a random chance into an "interest score", e.g. the interest score of the interaction with an activity equals 0 ("zero interaction") if the user is to be present within the interest area of a venue associated with the activity with $e^0$ ($e^0=1$) times higher (lower) probability than the random chance; the interest score of the interaction with the activity equals +1 ("positive interaction") if the user is to be present within the interest area of a venue associated with the activity with $e^{+1}$ (2.72 to the power of +1) times higher probability than the random chance; the interest score of the interaction with the activity equals +2 ("positive interaction") if the user is to be present within the interest area of a venue associated with the activity with $e^{+2}$ (2.72 to the power of +2) times higher probability than the random chance; the interest score of the interaction with the activity equals −1 ("negative interaction") if the user is to be present within the interest area of a venue associated with the activity with $e^{-1}$ (2.72 to the power of −1) times lower probability than the random chance; the interest score of the interaction with an activity equals −2 ("negative interaction") if the user is to be present within the interest area of a venue associated with the activity with $e^{-2}$ (2.72 the power of −2) times lower probability than the random chance, etc.

An interaction of a user with an activity associated with a public venue according to the invention may be further evaluated with regard to frequency of the user's presence at the venue during a defined period of time (the term "frequency of presence" means a number of times that the user was registered "present" at the venue during a define period of time), e.g. the interest score is normalized depending on the number of times the user is registered at the venue during a define period of time, e.g. the interest score is multiplied by the number of times the user has registered at the venue per period of time. A defined period of time of the invention may vary in different embodiments and, thus, it may be a period of time of any desirable length, e.g. 1 day, 1 week, 1 month, 1 year, etc. The length of the defined period of time is be normally defined depending on particular embodiments of the invention.

According to the invention, a high interest score point of an interaction of the user with an activity may be correlated with a high interest of the user to one (or more) public activity(ies) associated with venues within the neighborhood area of check-in, i.e. the scoring points of the user's interaction with public activities as described above reflect the level of the user's interest to public activity(ies) associated with the venues: the higher the score point the greater the interest and vice versa. Thus, according to the invention, it is possible to define the user's scope of interests by describing interaction of the user with the public activities.

Thus, defining the scope of the user's interests according to the invention typically comprises the following steps performed in any order: (i) categorizing one or more public venues associated with at least one public activity within a selected geographical area according to the category(ies) of the at least one public activity, and (ii) describing interaction of the user with one or more of said public activities during a defined period of time.

In one embodiment, a public venue in a selected geographical area may be described by an activity profile that comprises a listing of categories of public activities at the venue, i.e. directly associated with thereof. However, the interaction of a user with this directly associated public activity (e.g. using a scoring system as described above) may, with high probability, also reveal the user's interest to the activities of the same category indirectly associated with this venue, i.e. directly associated with public venues within the neighborhood area of the venue of interest.

For example, a public venue where the user registers his/her presence may be a place for a certain category of public activities (i.e. the venue is directly associated with that public activity). If this activity is the only one public activity that is directly associated with the venue, the activity profile of the venue may comprise only this category of public activities, but the interest profile of the user, whose presence was registered at that venue during a defined period of time, may contain all the mentioned activities, which are directly associated with the public venues located in the neighborhood area of the venue where the user registers his/her presence.

In other embodiments, a public venue may be directly associated with one or more public activities that belong to different categories of public activities, i.e. the public venue is a place for one or more categories of public activity(ies) (i.e. directly associated with the venue), e.g. a sport center comprising a shop and cafe, and it is located in the neighborhood of one or more venues associated with other categories of public activities, e.g. a movie theater, a bank, a pharmacy. According to the invention this public venue may be also indirectly associated with the latter and other public activities associated with the neighborhood venues, and the interest profile of the user, whose presence was registered at the venue, but not at neighborhood venues, may nevertheless comprise the categories of public activities associated with the neighborhood venues.

In one embodiment, a public venue of the invention may be a place that is not associated with any particular public activity (that can be categorized according to the invention), but it is rather a public place that is located in the neighborhood of one or more public venues which are associated with one or more category(ies) of public activities. In such embodiments, the public venue may be indirectly associated with one or more categories of public activity of the one (or more) neighborhood public venues, and thus an interest profile of the user who was registered at that public venue may include public activities associated with the neighborhood venues.

All activities in the check-in neighborhood area may be included in the interest profile of the user. The size of the neighborhood area may be set the same for all interest profiles of users and places, which are included in the analysis, i.e. compared, ranked and grouped according to similarity. In order to determine the size of the check-in neighborhood area, the following criteria is taken in account: a maximum geographical distance from the check-ins to the activities at which the difference between the probability to find activity(ies) becomes statistically insignificant from the probability to find activity(ies) expected from their random distribution around the check-in, i.e. when the interest score of check-in approaches 0. The term "geographical distance" means a distance from the location of check-in to a neighborhood public activity. The distances between the check-ins and activities may be defined approximately (which is indicated by the term "about") and distances from about 0 km to 2 km and longer than 2 km, e.g. 3 km, 4, km, from 5 km to 7 km, are included.

Thus, using different approaches as described above, the methods of invention provides a plurality of databases, which, in one embodiment may be a database of interest profiles of registered users of one or more mobile applications, in another embodiment, may be a database of interest profiles of groups of registered users of one or more mobile applications, in another embodiment, may be a database of interest profiles of public venues and/or geographical places, in another embodiment, may be a database of interest profiles of groups of venues/places.

The databases of invention may be used in different embodiments for, e.g., (i) grouping different users according to the scope of their interests reflected in their interest profiles (ii) analyzing socio-geographic behavior of the users within a selected geographical area (iii) creating a rank of public places with similar interest profiles within a selected geographical area, and (iv) creating a rank of users with similar interest profiles to interest profiles of a venue or a group of venues (grouped based on a type of the businesses, name of the business with multiple locations, and other selection criteria). Accordingly, in one embodiment, the database of the invention may be used for targeted advertising in another embodiment, it may be used for social-networking in another embodiment, it may be used for recommendations.

BRIEF DESCRIPTION OF THE DRAWINGS

The disclosure below is made with reference to the accompanying drawings may be described as follows.

FIG. 1 is an example of information associated with check-ins of two users recorded and stored in a database of a mobile application.

FIG. 2 is an example of transformation of information associated with a user check-in and conversion it into a format required for calculation of user interest profile. This includes removing of personal identifiable information (phone number, email address etc), copying of data associated with physical location of the check-in and time of visit, and adding fields, which describes categorisation of public activities associated with the check-in according to the taxonomy structure (FIG. 34), which is explained in detail on the FIGS. 13 and 14.

FIG. 4 is an example of a process of extracting check-ins of user_1 and user_2 of a mobile application within a selected geographic area. Check-ins located outside of the perimeter of the geographic area are removed from the database of check-ins of the user-1 and user-2. The perimeter is outlined by a dashed line.

FIG. 5 is an example of a process of extracting check-ins of user_1 and user_2 of a mobile application within a selected period of time. This figure shows the selection of check-in happened during three months (April, May, and June). Check-ins outside of this time period are removed from the database of check-ins of the user_1 and user_2.

FIG. 6 is an example of a process of extracting check-ins of user_1 and user_2 of a mobile application within a selected period of time for a selected day categories (e.g. weekdays vs. weekends). This figure shows the selection of check-in happened on weekday during the selected period of time. Check-ins outside of these days are removed from the database of check-ins of the user_1 and user_2. FIG. 7 is an example of a process of extracting check-ins of user_1 and user_2 of a mobile application within a selected period of time during a selected time interval (e.g. 9.00-18.00). This figure shows the selection of check-in happened on weekday during the selected period of time between 9.00-18.00. Check-ins outside of this time period are removed from the database of check-ins of the user_1 and user_2.

FIG. 8 is an example of setting a size of the check-in neighbourhood area with public activities associated with public venues, which will be used for the calculation of the interest profile of a user.

FIG. 9 is a process of selection of neighbourhood areas of each check-in according to the FIG. 8

FIG. 10 is a process of obtaining of the information about public venues located within the neighbourhood areas of each check-in (FIG. 9) from a geospatial database. A sample format of data associated with each venue in a geo-spatial database is shown.

FIG. 11 is a process of transformation of the information associated with public venues obtained according to the FIG. 10 into a format used for the calculation of a user interest profile. This includes removing of non-relevant information (e.g. URL, database-specific ID, etc), copying of data associated with physical location and postal address of the venue, and adding fields, which describes categorisation of public activities associated with the public venue according to the taxonomy structure (FIG. 34), which is explained in detail in FIGS. 13 and 14.

FIG. 18 is an example of calculation the area of each sampling group in the check-in neighbourhood area using standard mathematical procedures for measuring the area of a circle. The results of these calculations are used for calculation of user interest profiles on the next steps.

FIG. 19 is an example of calculating the probability to find an activity at the primary level (e.g. "Sport") in each sampling group for each check-in. The algorithm for calculating the probability and subsequently its natural logarithm is shown for each step in the table (from the top to bottom). In a very case of 0 probability, the natural logarithm is not taken an the field id left blank. The natural logarithms of the probability to find the activities at the each primary level are stored as an Intermediate Record_3 in the database and used for calculating the interest profile of a user during the next steps.

FIG. 20 is an example of calculating the average probability of finding a primary activity (e.g. "Sport") in each sampling group from a database of selected check-ins of a user. The average natural logarithm of probability to find each primary activity is called the Interest score, which is used to calculate user interest profile on the next steps.

FIG. 21 is an example of calculating the Total interest score of a user within the interest area around each user. The interest score will depend on the distance from a user, e.g. the number and range of the sampling groups selected to calculate the total interest score. The positive value of the total interest score will suggest about the amount of attraction each user has to a particular category of activities within the selected interest area. The negative values of the total interest score will suggest about the amount of repulsion each user has to a particular category of activities within the selected interest area. The calculated total interest scores for each activity at the primary level are stored as an Intermediate record_4 in the database and used for calculating the interest profile of a user during the next steps.

FIG. 22 is a procedure showing the calculation of the final normalized Interest profile of a user is shown. This includes multiplication of the total interest score of the user (FIG. 21) by the rate of check-ins/day (FIGS. 5-7) and division by the size of the selected geographic area.

FIG. 23 shows three examples of interest profiles of users with different check-in patterns in the central London. The first user (Group1) check-ins almost evenly at each category of the primary level activities. The second user (Group2) checks-in exclusively at the activities from the primary level "Eating/Drinkin" only, and the third user (Group3) checks-in exclusively at the activities from the primary level "Sport" only.

FIG. 24 shows samples of interest profiles of three different users from the Group1 and Group2 (FIG. 23).

FIG. 25 is The graphs show that users from the Group1 and Group2 (FIGS. 22 and 23) are more similar to each other than between the groups.

FIG. 27 is an example of selecting of a particular group of places within a selected geographic area for calculating the interest profile of a place. The 37 locations corresponding to Costa coffee shops were selected in the central London.

FIG. 29 is a process of selection of neighbourhood areas of each place according to the FIG. 28.

FIG. 30 is a process of obtaining of the information about public venues located within the neighbourhood areas of each place (FIG. 29) from a geospatial database. A sample format of data associated with each venue in a geo-spatial database is shown.

FIG. 31 shows an algorithm describing the calculation of the normalized Interest Profile of the places associated with Costa location within the selected geographic area (e.g. 37 Costa coffee shops in central London).

FIG. 34 is a sample scheme for categorisation of public activities into the established taxonomy structure consisting of Tier1 and Tier2 categorisation levels.

DESCRIPTION

Figure 3:
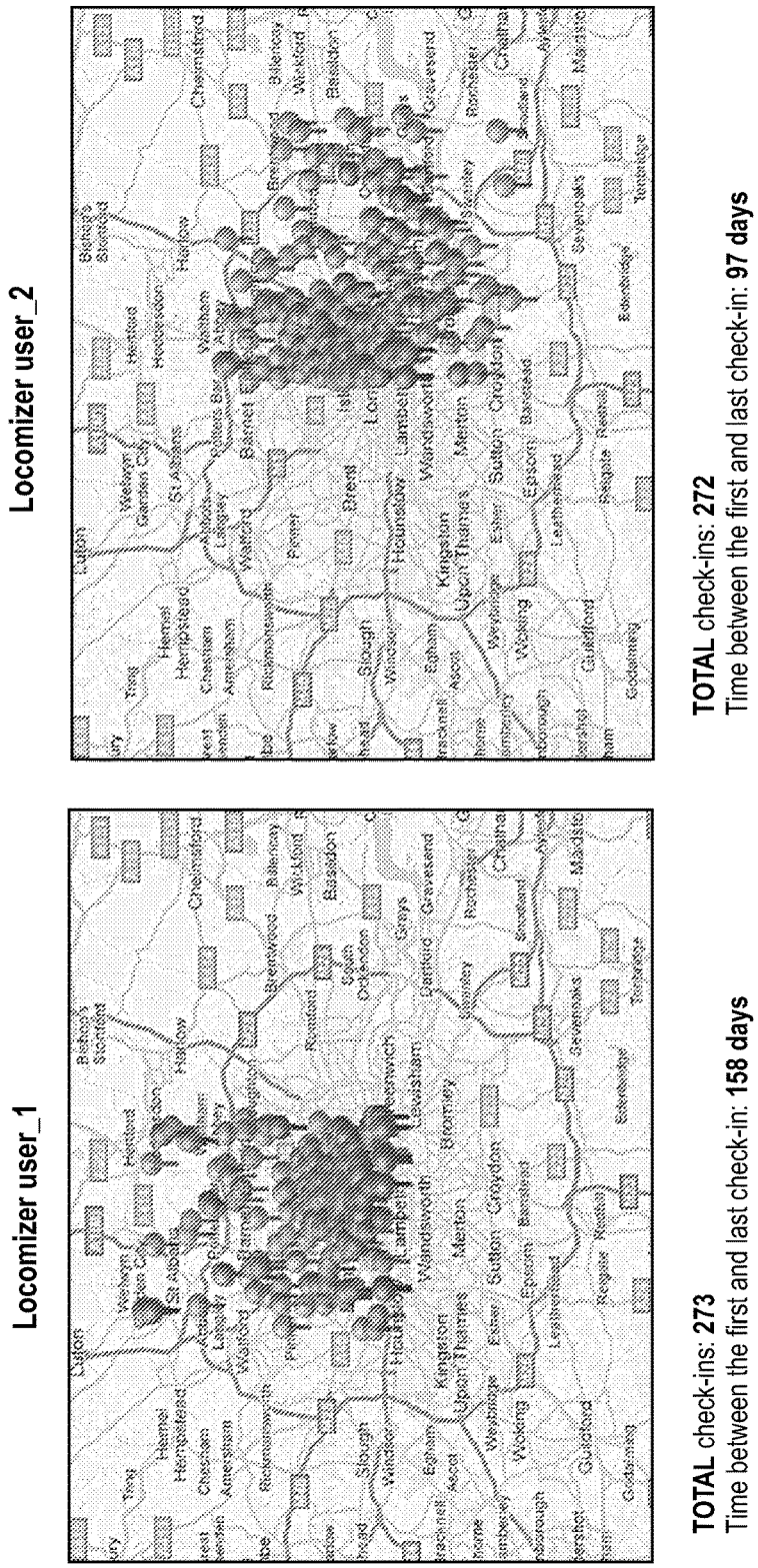
FIG. 3 is an example of check-ins associated with user_1 and user_2 received from the database of a mobile application (or mobile service provider). The check-ins are mapped on a geographic layer.

The following is a description of some not limiting embodiments of the invention with reference to the accompanying figures as described above.

FIGS. 1 to 34 illustrate different aspects and non-limiting embodiments of the methods of the invention, in particular steps of method (a) for generating an interest profile of an individual, who is the registered user of one or more mobile applications that are capable of, or that are linked to a facility that is capable of receiving and storing information which may include: (i) the registered user ID, (ii) geographical coordinates of a venue where the user is checking in to said mobile application(s) or to said facility, and (iii) time point when the check-in is taking place, wherein the method may comprise the following:

1. obtaining information about a registered user of one or more mobile applications from one or more databases linked to said mobile applications, wherein said information comprises data (i), (ii) and/or (iii) (as above), wherein said data relate to a selected geographical area and a defined period of time
2. analyzing the data of (1), identifying public activities associated with (1) and with public venue(s) within the neighborhood area of (1), and categorizing said venues with regard to public activity(ies) associated with thereof
3. analyzing interaction of the registered user with the activities of (2)
4. generating an interest profile of the registered user, wherein said interest profile comprises a description of the user's relation to public activities associated with the venues of (2)

and steps of method (b) for generating an activity/interest profile of a venue/geographic location in a selected geographical area, wherein the method may comprise the following:

1. obtaining or receiving information about a public venue of interest located within a selected geographical area from one or more geo-spatial databases
2. analyzing the data of (1), identifying public activities associated with (1) and with public venue(s) within the neighborhood area of (1), and categorizing said venues with regard to public activity(ies) associated with thereof
3. analyzing interaction of the public venue of interest of (1) with the activities of public venues of (2)
4. generating an interest profile of the public venue of interest of (1), wherein said profile comprises a description of the venue's relation to public activities associated with the venues of (2).

In particular, an example of data comprised of individual check-in profiles of two different registered users of the mobile application or service, such as Foursquare, e.g. Foursquare user_32 and Foursquare user_2584, of method (a) are shown in FIG. 1.

The references herein to Foursquare shall not be taken as being limiting to a Foursquare implementation, and it will be understood that Foursquare is merely an example of a mobile application, website or service which could be utilised with the invention.

FIG. 2 presents information comprised in an individual profile of the user database ("Locomizer user database") according to the invention (the profile is identified as "Locomizer user") and the way as to how this information is put together.

The references herein to Locomizer shall not be taken as being limiting to Locomizer, and it will be understood that Locomizer is merely a name used to designated a mobile application, website or service which could be utilised with the invention.

A Locomizer user profile, e.g. profile of Locomizer user_1 of FIG. 2, which corresponds to a certain user profile for accessing a service, such as Foursquare, e.g. Foursquare user_32, comprises two parts:
  (i) information extracted from the certain profile in the service database (identified in FIG. 2 as "copied fields"), in particular
    (a) data identifying the corresponding registered user (for example of Foursquare, e.g. the user's Foursquare ID and user's personal name),
    (b) data identifying the venue where the user checked-in to the service, e.g. Foursquare, such as the venue name, address and geographic coordinates, and/or (c) data on the date and time of the check-in; and
  (ii) description of the venue according to the invention, for example: categories of public activities associated with the venue (identified in FIG. 2 as "added fields").

Further, both the service venue and the registered check-in obtain new IDs in the Locomizer user's profile.

FIG. 3 shows an example of all geographical locations of check-ins taken from two exemplary Locomizer users profiles checked-in to the service, e.g. Foursquare, at venues associated with at least one public activity according to the invention during a time period from the first to the last check-in, i.e. 158 days for user_1 and 97 days for user_2 as of FIG. 3. FIG. 4 shows the selected area 1 of FIG. 3 which comprises venues of check-ins for both users of FIG. 3.

FIG. 5 is a graphic representation of analysis of check-ins of the Locomizer user_1 and Locomizer user_2 within the selected area 1 during a defined period of time. The analysis reveals: (i) the number of check-ins the two users each did within the selected area 1 during April, May and June (i.e. 90 days), and (ii) the number of their check-ins per day within this period of time (presented as the user corresponding bar-codes).

FIG. 6 is a graphic representation of an additional step of analysis of check-ins of the Locomizer user_1 and Locomizer user_2 within the selected area 1 during weekdays in April, May and June. The analysis reveals: (i) the number of check-ins the two users each did within the selected area 1 during the weekdays in April, May and June (i.e. 63 days), and (ii) the number of their check-ins per day within this period of time (presented as the user corresponding bar-codes).

FIG. 7 is a graphic representation of another additional step of analysis of check-ins of the Locomizer user_1 and Locomizer user_2 within the selected area 1 during 9.00-18.00 time intervals on the weekdays in April, May and June. The analysis reveals: (i) the number of check-ins the two users each did within the selected area 1 during 9.00-18.00 time intervals on the weekdays in April, May and June, and (ii) the number of their check-ins per day within this period of time (presented as the user corresponding bar-codes).

FIG. 8 shows a venue of a single check-in by the Locomizer user_1 within a part of the selected area 1 within the defined period of time (i.e. April, May and June) and identifies the neighborhood area as defined by the invention (i.e. 2 km from the check-in 1).

FIG. 9 shows the selected area 1 and a number of the neighborhood areas (or "check-in areas").

FIG. 10 shows the check-in location (red pin) and all venues (black pins) identified within the 2 km neighborhood area around the venue of the check-in 1 on the map and two examples of the identified venues description extracted from the Factual.com database (i.e. venue 1 and venue 2).

FIG. 11 is a schematic presentation of creating a profile of a venue associated with at least one public activity (Locomizer venue) according to the invention in the database of the invention. The Locomizer venue profile comprises (i) the venue ID information, including the venue name, geographic coordinates and address ("copied fields" (e.g. from the Factual.com database)) and (ii) a description of categories of public activities associated with the venue according to the present invention ("added fields").

Figure 12:
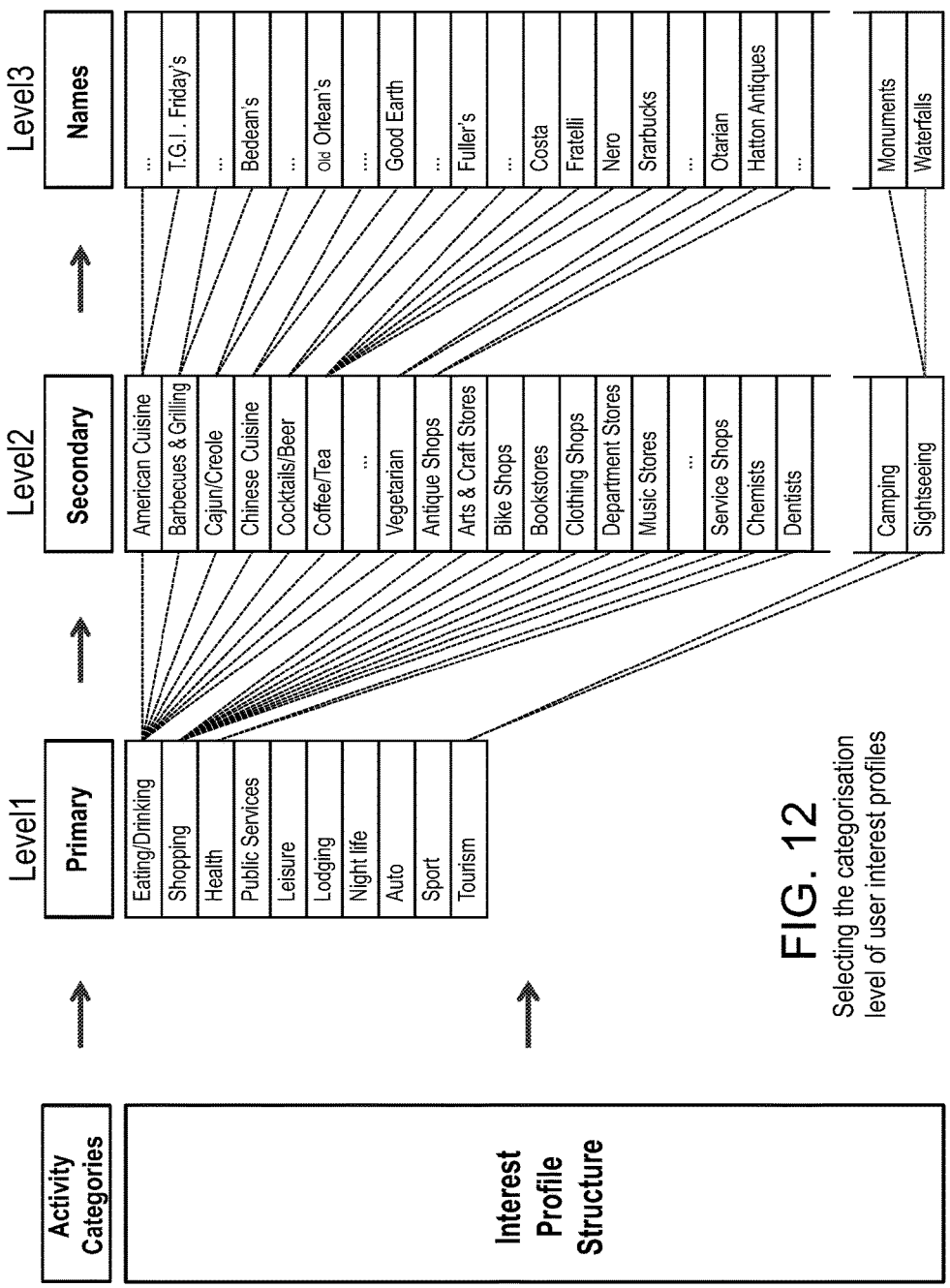
FIG. 12 is an example of categorisation level of user interest profile, which could be calculated at the level 1, level 2, and level 3. The interest profile at each categorisation level will describe personal interactions with activities at a low granularity primary level (level 1), secondary intermediate granularity level (level 2), and tertiary high granularity level (level 3).

FIG. 12 presents an exemplary scheme of selecting the categorization level of activities associated with at least one public venue, which can be used for creating an interest profile of the invention.

Figure 13:
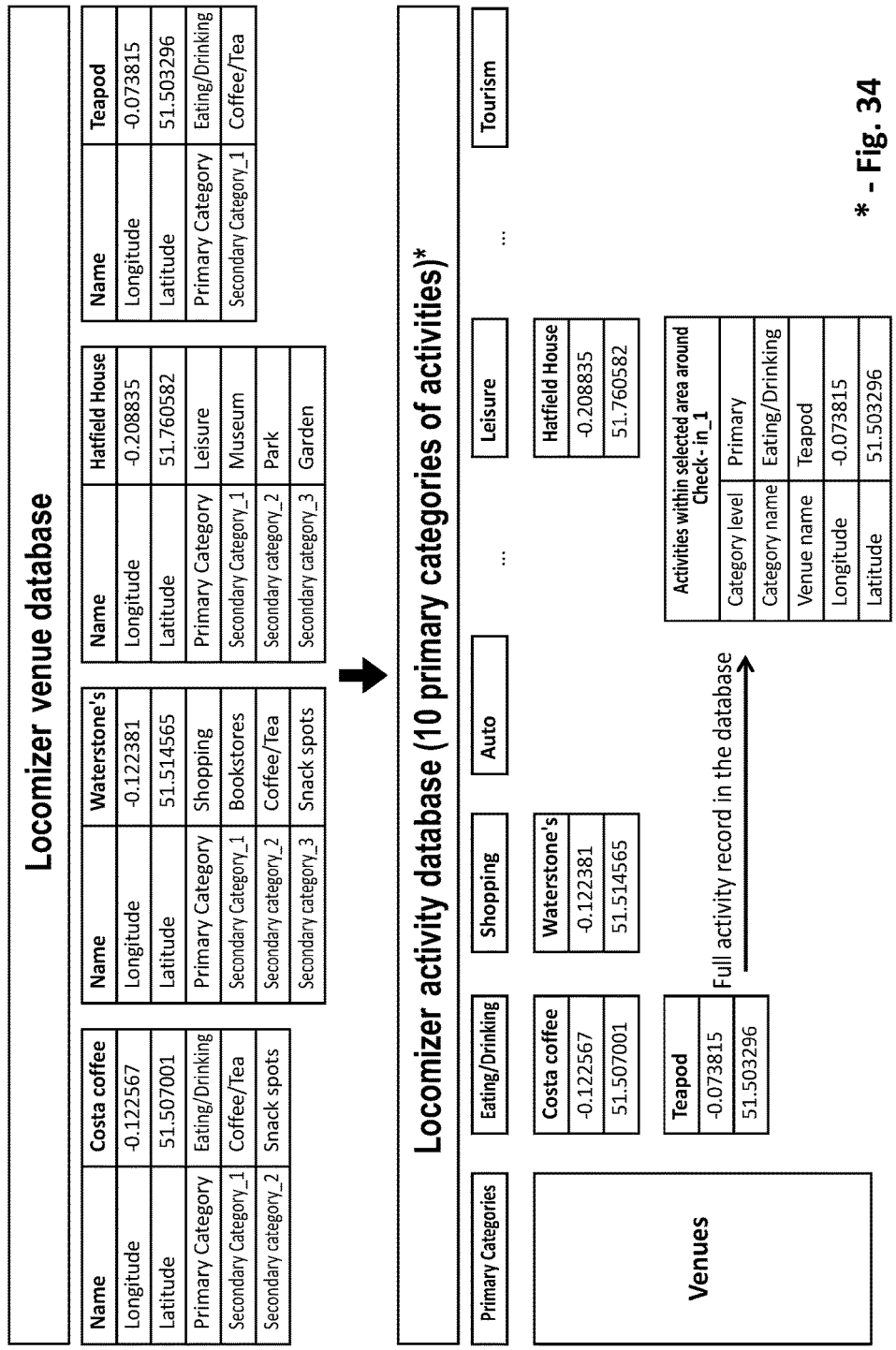
FIG. 13 is a process describing the transformation of locomizer venue database created as shown on the FIG. 10 into locomizer activity database used for calculating user interest profile at the primary categorisation (FIG. 12).

FIG. 13 shows one possible level of categorization of venues recorded in the database of the invention (i.e. Locomizer Activity database) following the scheme of FIG. 12.

Figure 14:
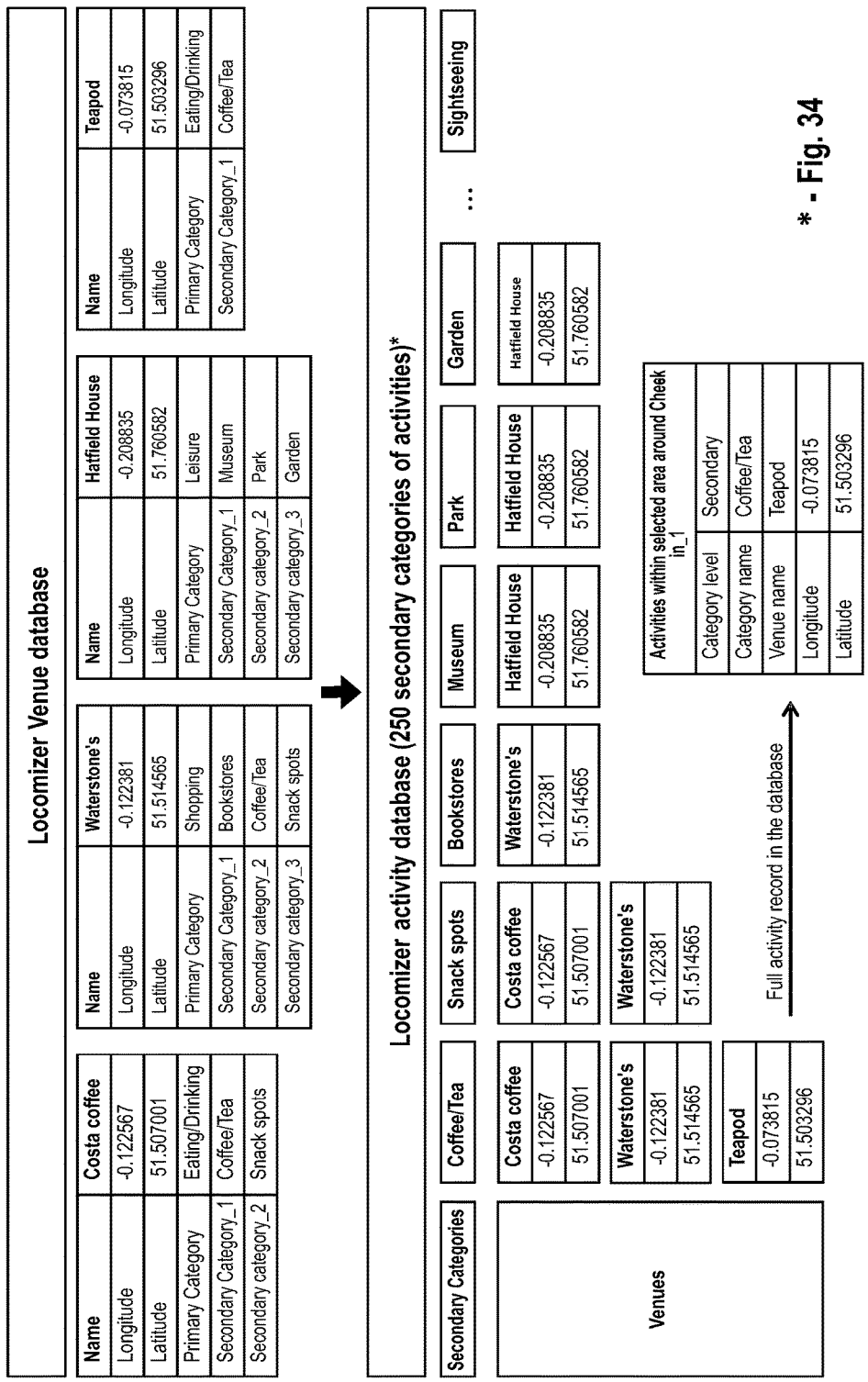
FIG. 14 is a process describing the transformation of locomizer venue database created as shown on the FIG. 10 into locomizer activity database used for calculating user interest profile at the secondary categorisation (FIG. 12).

FIG. 14 shows another possible level of categorization of venues recorded in a database of the invention (i.e. Locomizer Activity database) following the scheme of FIG. 12.

Figure 15:
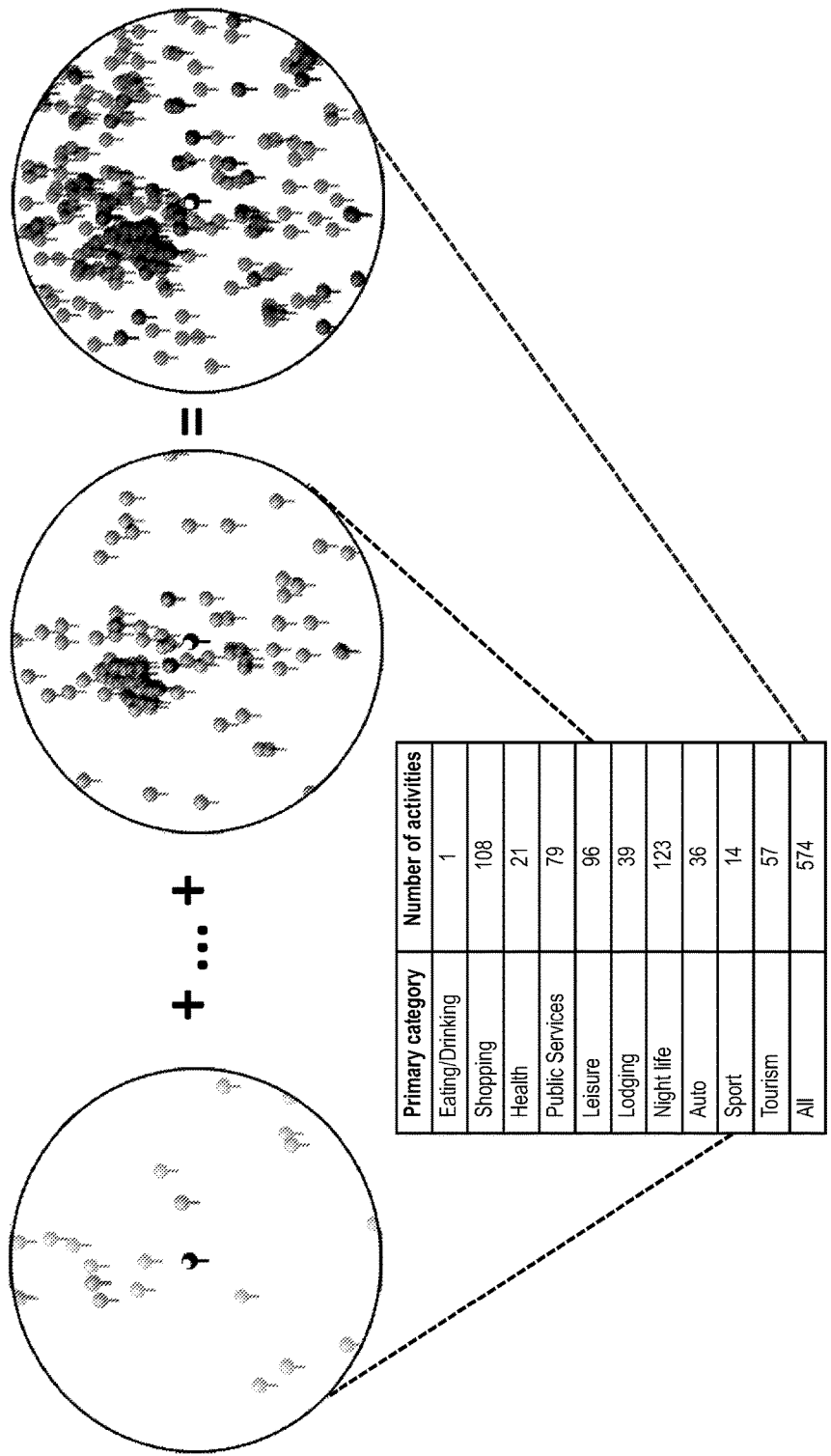
FIG. 15 is an example of grouping counting the primary level activities from the neighbourhood areas of each check-in using the activity database at the primary level (FIG. 13).

FIG. 15 is a graphic presentation all activities (identified in the figure as black pins) within the check-in 1 area (see FIG. 10) identified as a red pin, wherein the entirety of public activities comprises activities associated with different public venues categorized according to the invention (e.g. "Sport"—shown as green pins, "Leisure"—shown as blue pins, etc).

The distances from the venue 1 (check-in 1) to activities of all categories within the check-in area 1 are measured and recorded, for example, by a server processing device in a database of the invention.

Figure 16:
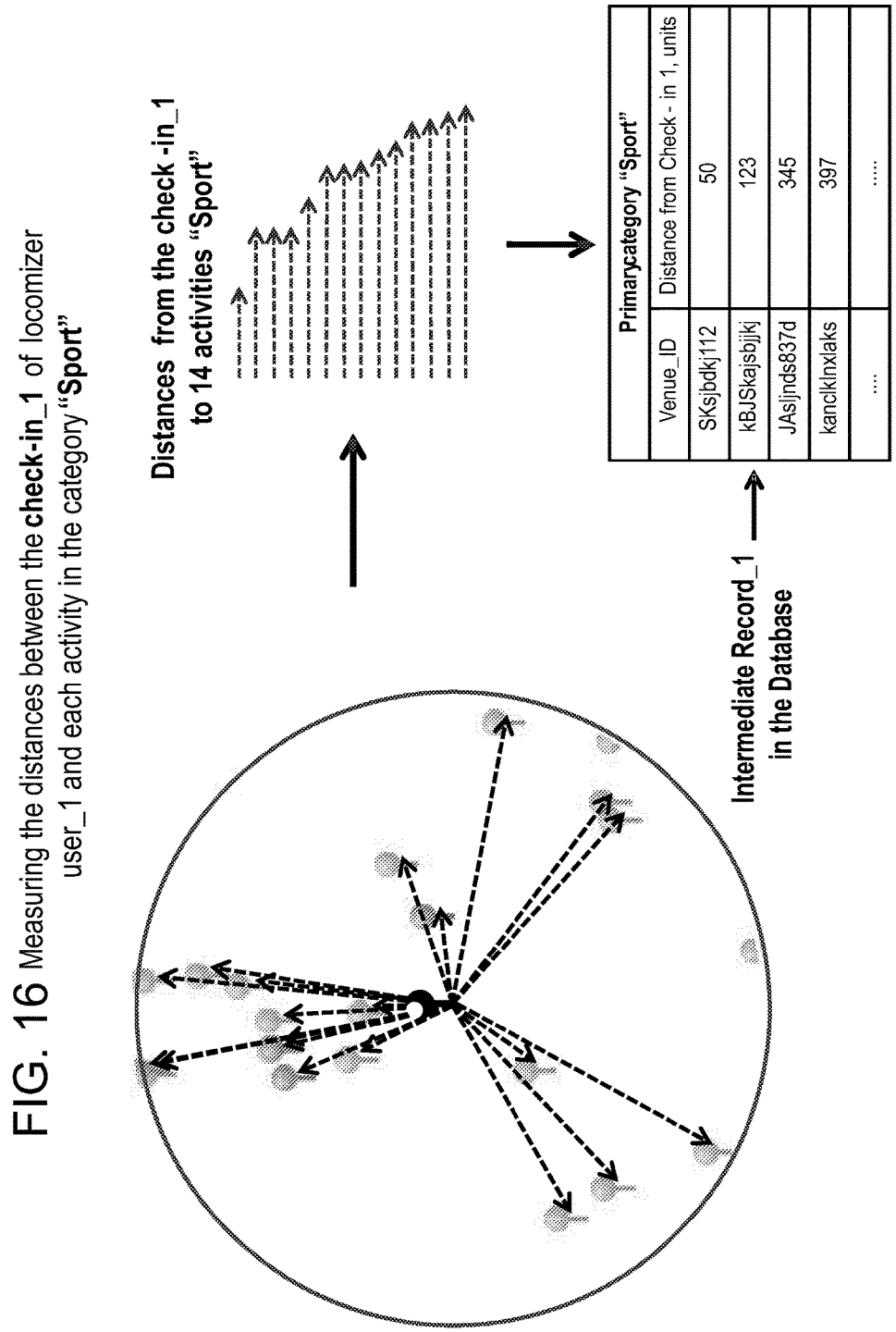
FIG. 16 is a process of measuring and recording distances between each check-in and all the activities at each primary level within the neighbourhood area of the check-in. The primary level activity "Sport" was used as an example, and the same procedure is carried out for each activity at the primary level.
Figure 17:
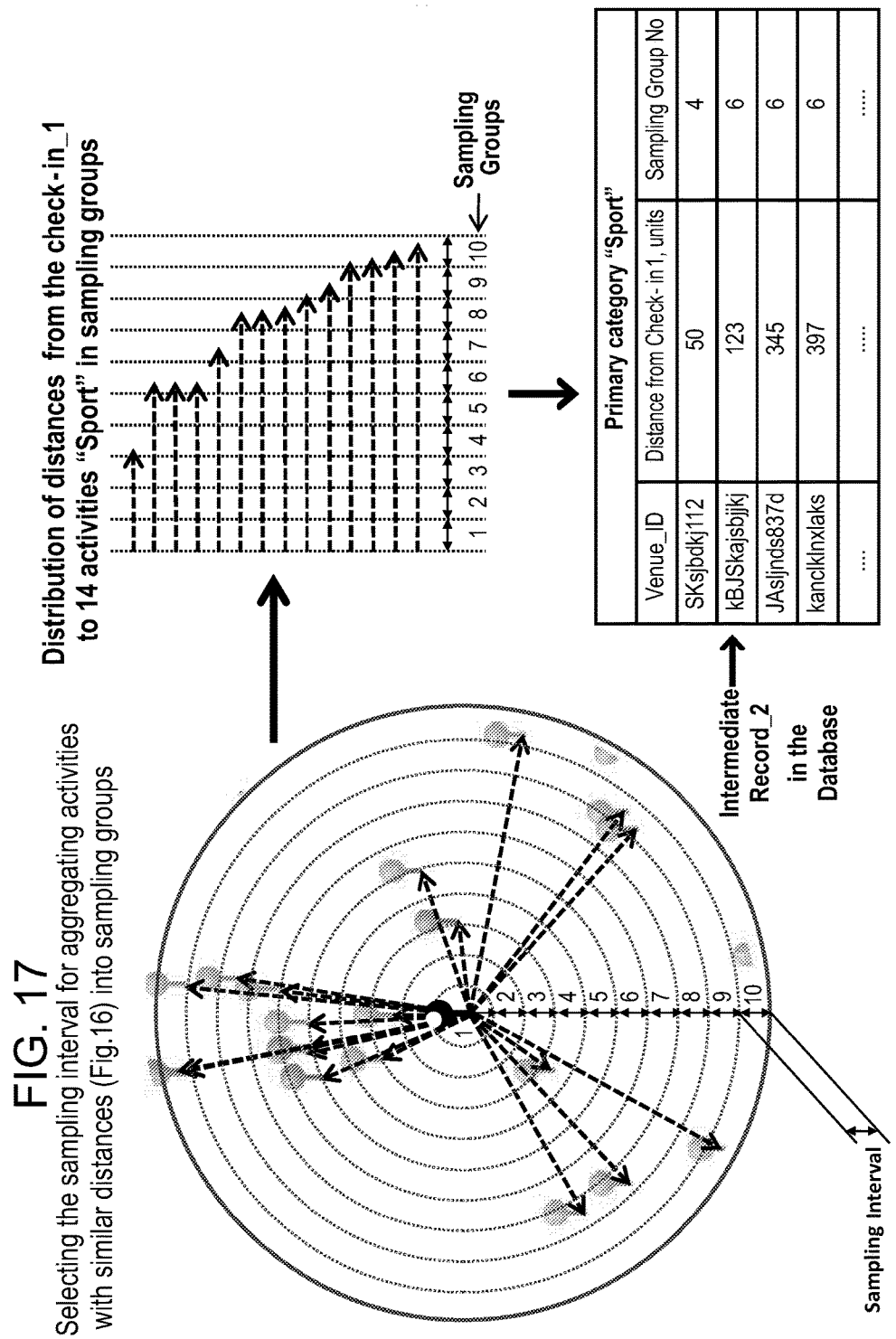
FIG. 17 is an example of grouping the measured distances between check-in and the activities at each primary level (FIG. 16) into the sampling groups. The number of measured distances found in each distance interval from the check-in are stored as an intermediate Record_2 in the Database and used for calculation of user interest profiles on the next steps.

FIG. 16 shows one example of such record for activities categorized as "Sport", i.e. for 14 activities of the category "Sport" of FIG. 15.

The check-in 1 area is graded using a numerical scale, e.g. from 1 to 10, wherein the lowest number marks the area which is closest to check-in_1 and highest number—the furthermost. All activities identified in the neighborhood area of check-in 1 (e.g. the category "Sport"—FIG. 15) are aggregated into groups corresponding to their distance from check-in 1, wherein the groups correspond to the grades of the latter numerical scale; accordingly, one digit of the scale is termed "sampling interval" (see FIG. 17). The group of activities located in a sampling interval is termed herein "sampling group". The area of a sampling interval is then calculated as shown in FIG. 18.

Further, the probability of the presence of activity(ies) associated with a particular public venue in a certain sampling group can be calculated using one or more of the following parameters: the minimal and maximal distance of a certain sampling group of users with or without activities from check-in 1 the number of activities of the particular type within the certain sampling group; the density of the activities of the particular type within the certain sampling group; the total size of all sampling groups; the total number of activities of the particular type in the check-in 1 area; the average density of the activities of the particular type in the check-in 1 area. Natural logarithm of the probability was used during further steps for calculating the user interest profile. If in a very rare case the calculated probability equals zero, the natural logarithm of it cannot be calculated and the intermediate record 3 in the Database is left as blank. One example of such calculation is illustrated in FIG. 19. The calculation data are (is) then recorded in a database of the invention.

The natural logarithm of the probability of the presence of an activity(ies) of the particular type is consequently calculated for each check-in (i.e. from check-in 1 to check-in N) extracted within the selected geographical area during the defined period of time. Then the average natural logarithm of the probability of the presence of an activity(ies) of the particular type for all extracted check-ins within the selected geographical area during defined period of time is calculated by pulling together the natural logarithms of the probabilities computed for each sampling group of each check-in and dividing by N. One example of such calculation is shown on FIG. 20.

The probabilities for each check-in could be scored taking into account the 1) duration of the user presence at the venue of interest 2) number purchases made at that venue and 3) amount of money spent at that venue etc.

The average probabilities are used to calculate the interest score of the user using the following transformations: (1) defining the interest area where the interest score will be calculated (e.g. if the sampling groups from the first half of the check-in area will be included in the interest area the interest score will be called a short-range interest score, if the sampling groups from the last half of the check-in area will be included in the interest area the interest score will called a long-range interest score, if the majority of sampling groups will included in the interest area the interest score will be called a wide-ranging interest score, etc.)(3) pulling together all the interest scores for each sampling group within the interest area for an average check-in for a particular category of activities. The final number will represent the total interest score of the user to a particular category of activities. FIG. 21 shows an example of how the total interest score to the activity "Sport" of the Locomizer user_1 is calculated.

When the total interest scores of the user are calculated for every category of activities recorded in a database of the invention, the final normalized interest user profile may be calculated and recorded in the Interest Profile database. An example of such recording is shown in FIG. 22.

FIG. 23 shows three examples of user profiles with check-ins at different venues, which are directly associated with categories of activities equally distributed between the venues (group 1), or directly associated with activities from the category "Eating/Drinking" only (group 2), or directly associated with activities from the category "Sport" only (group 3). The maps of the venues, where check-ins were made and the corresponding user interest profiles are also shown.

FIG. 24 shows the interest profiles of six users, where three of them were from the group 1 (see above) with 92 check-ins at venues directly associated with activities evenly distributed between all categories, and the other three user profiles belong to the group 2 (see above), i.e. with 92 check-ins at venues directly associated with activities from the category "Eating/Drinking".

FIG. 25 compares the five user interest profiles (shown in different colors) from the groups 1 and 2.

Figure 26:
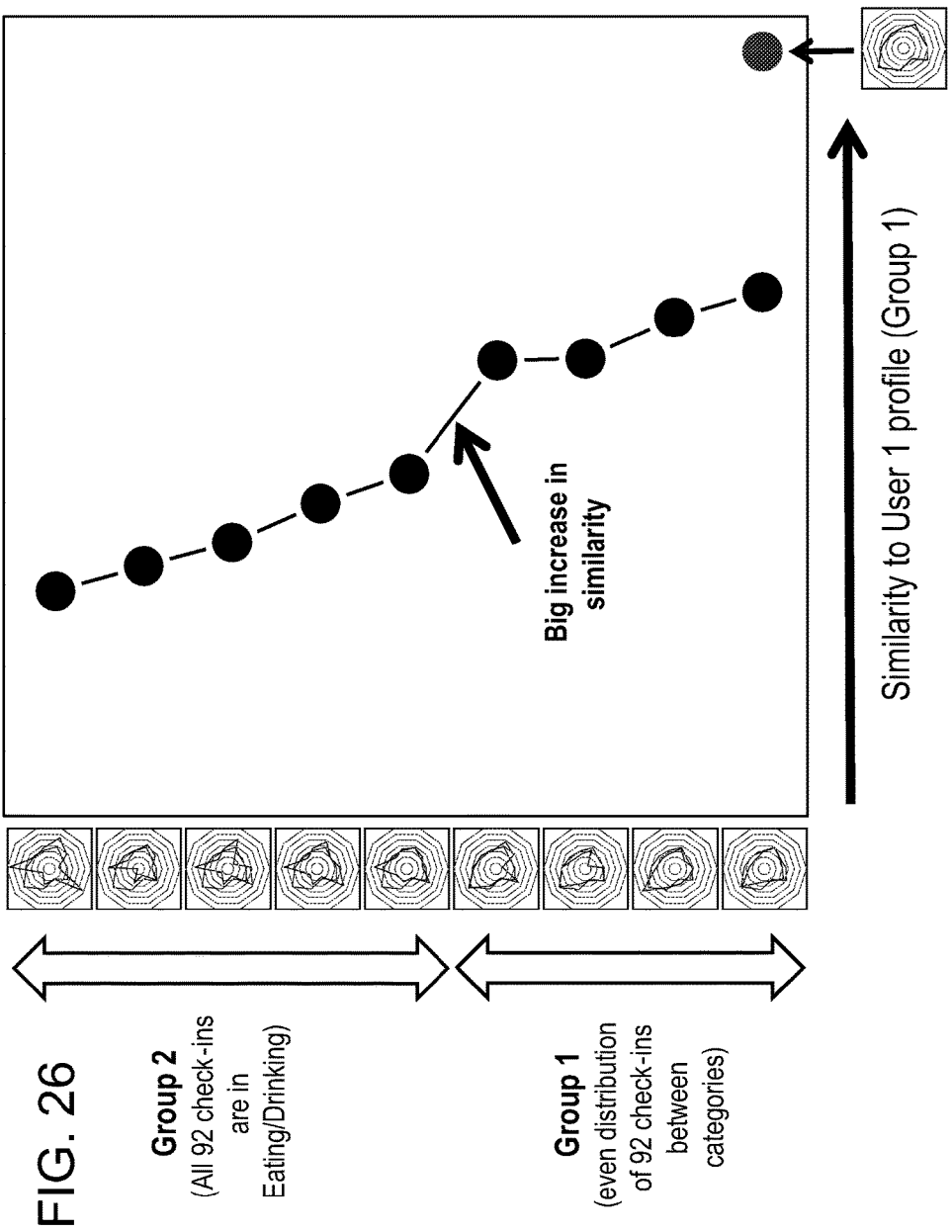
FIG. 26 is an example of ranking 10 sample user interest profiles from Group1 and Group2 (FIG. 25) based on similarity to the user1 profile from the Group1 calculated using the commonly used Euclidean distance algorithm (see the description in text).
Figure 28:
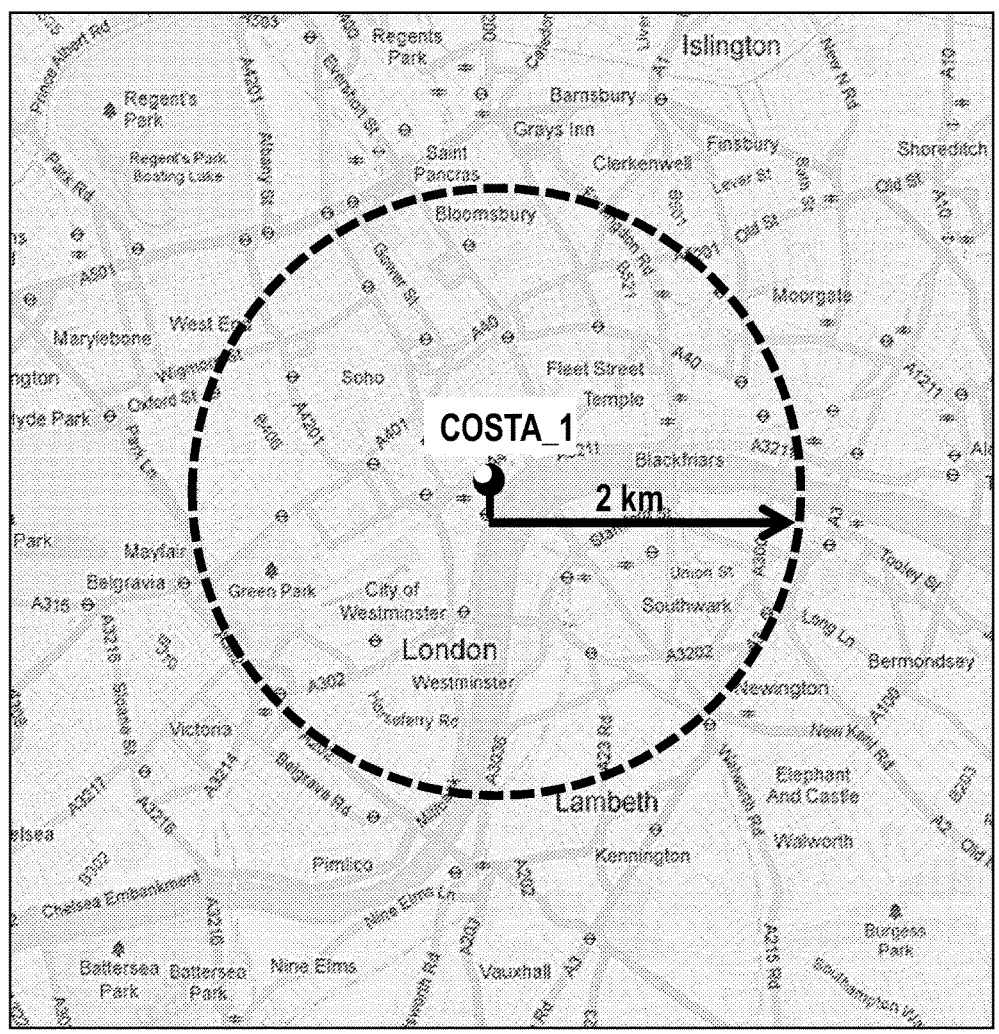
FIG. 28 is an example of setting a size of the place neighbourhood area with public activities associated with public venues, which will be used for the calculation of the interest profile of a place.
Figure 32:
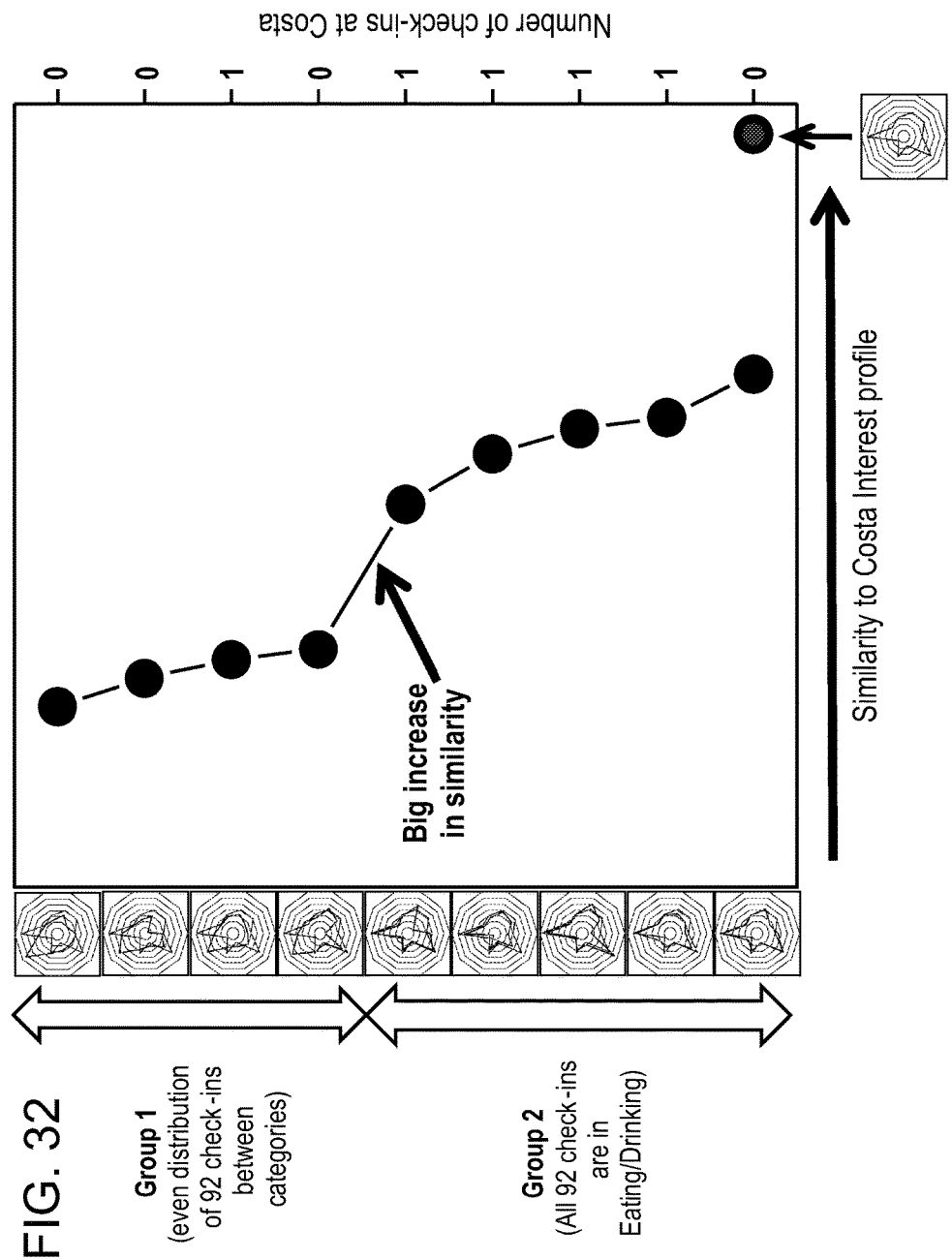
FIG. 32 is an example of ranking 10 sample user interest profiles from Group1 and Group2 (FIG. 25) based on similarity to the Costa interest profile (FIG. 32) calculated using the commonly used Euclidean distance algorithm (see the description in text).
Figure 33:
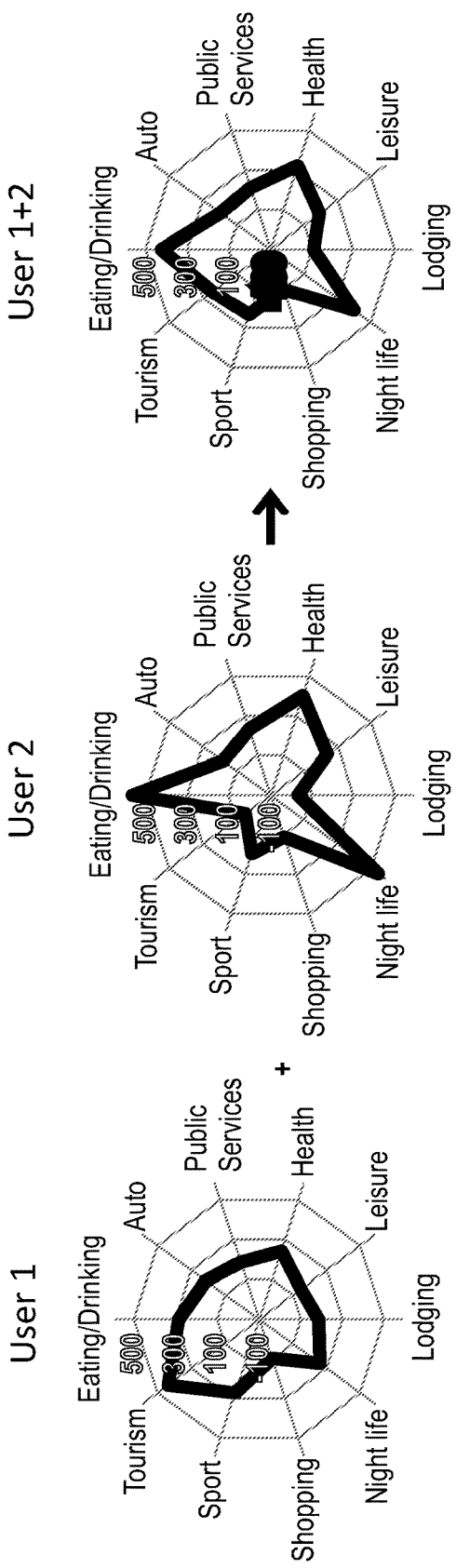
FIG. 33 is an algorithm describing the calculation of the average interest profile of a group of users based the individual interest profiles of each user. The values of interest profiles of users corresponding to a specific type of activity are summed up and divided by the number of users. This procedure is repeated for each type of activity and the resulting values obtained for each type of activity form an average interest profile of the group of users.

The user interest profiles could be ranked based on similarity to other user interest profiles in the database of the invention. In order to achieve this, the user interest profiles could be considered as N-dimensional array of data points, where the N stands for the number of the categories of activities in the interest profiles, and the interest score values for each category of activities define the coordinates of this data point in N-dimensional space. In this representation, the similarity scores between interest profiles could be measured as inversely proportional to the distances between corresponding data points in N-dimensional space. FIG. 26 shows one example of ranking the selected user interest profiles from the groups 1 and 2 according to their similarity to the user_1 profile from the group 1. In this particular case the Euclidean distance method was used to calculate the distances in 10-dimensional space (10 categories of activities) between the data points corresponding to the user_1 interest profile and the data points corresponding to the selected interest profiles from the groups 1 and 2.

The ranking of interest profiles based on their similarity could be performed using interest scores for all activities in the interest profiles or for a subset (at least one) of the selected activities.

Further, the analysis of the similarities between the interest profiles could reveal clusters of users whose interest profiles are much more similar with each other compared with the rest of the interest profiles in the database of the invention.

The similarity scores between any two interest profiles have an economic meaning of an effort or cost, which is required to convert one interest profile into another, e.g. to change the socio-geographical behavior of user(s) in order to maximize the probability of them to be present at the same location during a defined period of time.

The individual interest profiles could be combined together resulting in an average interest profile of the group(s) of users calculated according to FIG. 27. The grouped interest profiles could be compared and ranked as individual user interest profiles.

The individual interest profiles could be also compared to the interest profiles of the venue(s) of interest and ranked according to similarity between them. The Interest profiles of venue(s) are calculated similar to the interest profiles of people, where the steps include 1) selecting the geographic area and venue(s) of interest within that area (FIG. 28) 2) defining the size of the venue(s) neighborhood area (FIG. 29) 3) selecting the venue(s) neighborhood area with venues associated with public activities (FIG. 30) 4) extracting venues associated with public activities within the venue(s) neighborhood area from a geospatial database (e.g. Factual.com) (FIG. 31) creating the venue profiles associated with at least one public activity (Locomizer venue) according to the invention in the database of the invention (FIG. 11) calculating the venue(s) total interest score according to the steps described for calculating the user interest profiles on FIGS. 15-21 calculating the normalized interest profile of the venue(s) according to FIG. 32.

Further, the user interest profiles in the database of the invention could be compared with the interest profiles of the venue(s) in the database of the invention and ranked based on their similarity. The comparison between user interest profiles and venue(s) interest profiles is performed similar to the comparison between user interest profiles described above. One example of comparing and ranking the user interest profiles from the groups 1 and 2 to the interest profile of Costa (37 locations) is shown on FIG. 33.

The ranking of interest profiles based on their similarity could be performed using interest scores for all activities in the interest profiles or for a subset (at least one) of selected activities.

Further, the analysis of similarity between the interest profiles could reveal clusters of users whose interest profiles are much more similar with the interest profile venue(s) compared with the user interest profiles in the database of the invention.

The similarity scores between the user interest profile(s) and the venue(s) interest profiles have an economic meaning of an effort or cost, which is required to change the socio-geographical behavior of user(s) in order to maximize the probability of them to be present at the location(s) of venue(s) included in the corresponding interest profile of venue(s).

FIG. 34 shows an example of categorization of public activities associated with public venues into the established taxonomy structure.

Figure 35:
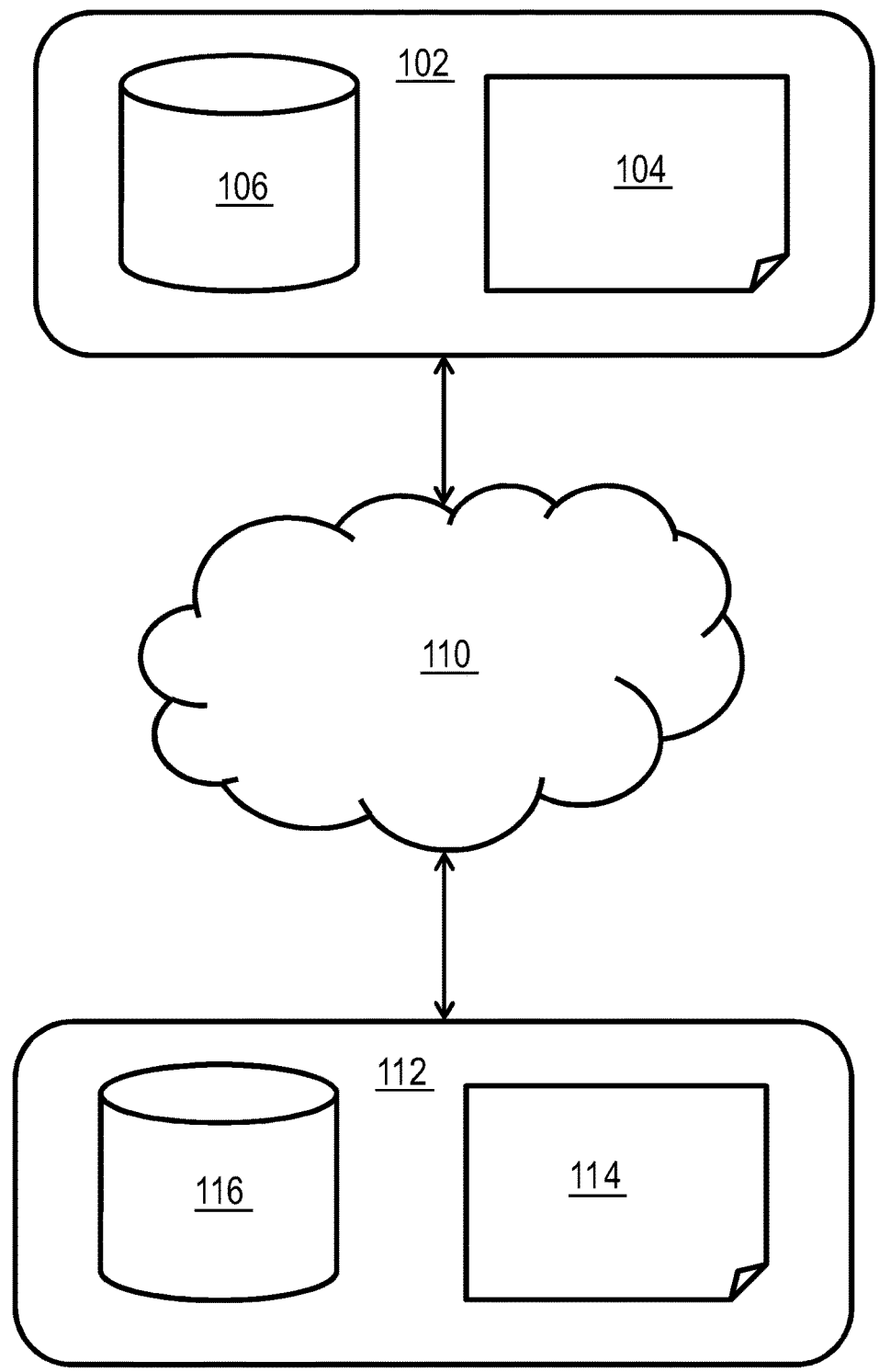
FIG. 35 is a representation of steps of methods implementing the invention.

FIG. 35 shows components which can implement aspects of the invention. Electronic device 102, which may be a wireless communication device, is in communication, for example wirelessly (via a cellular network or pack-based network connection, such as Ethernet or WiFi) with the Internet 110. The electronic communication device 102 comprises first processing circuitry 104 and first memory 106. The first processing circuitry 104 and first memory 106 are configured to implement aspects of the invention pertaining to the electronic communication device 102, and this may be achieved through the first processing circuitry 104 executing computer executable instructions stored in the first memory 106, these instructions are configured to implement aspects of the invention (as explained in further detailed below). The first processing circuitry 104 may comprise one or more processors for providing the functionality of the invention.

Also in communication with the Internet 110 is a service 112 which may be implemented on second processing circuitry 114 and second memory 116, for example as a server device connected to the Internet 110. The second processing circuitry 114 may comprise one or more processors for providing the functionality of the invention. The second processing circuitry 114 and second memory 116 are configured to implement aspects of the invention pertaining to the service 112, and this may be achieved through the second processing circuitry 114 executing computer executable instructions stored in the second memory 116, these instructions configured to implement aspects of the invention.

The service 112 and electronic device 102 are configured to communicate with each other via the Internet 110, for example to exchange the check-in data mentioned above.

Multiple electronic devices 102 corresponding to multiple users of the service 112 may be connected to the Internet and each can communicate with the service 112 and implement aspects of the invention as outlined above.

Figure 36:
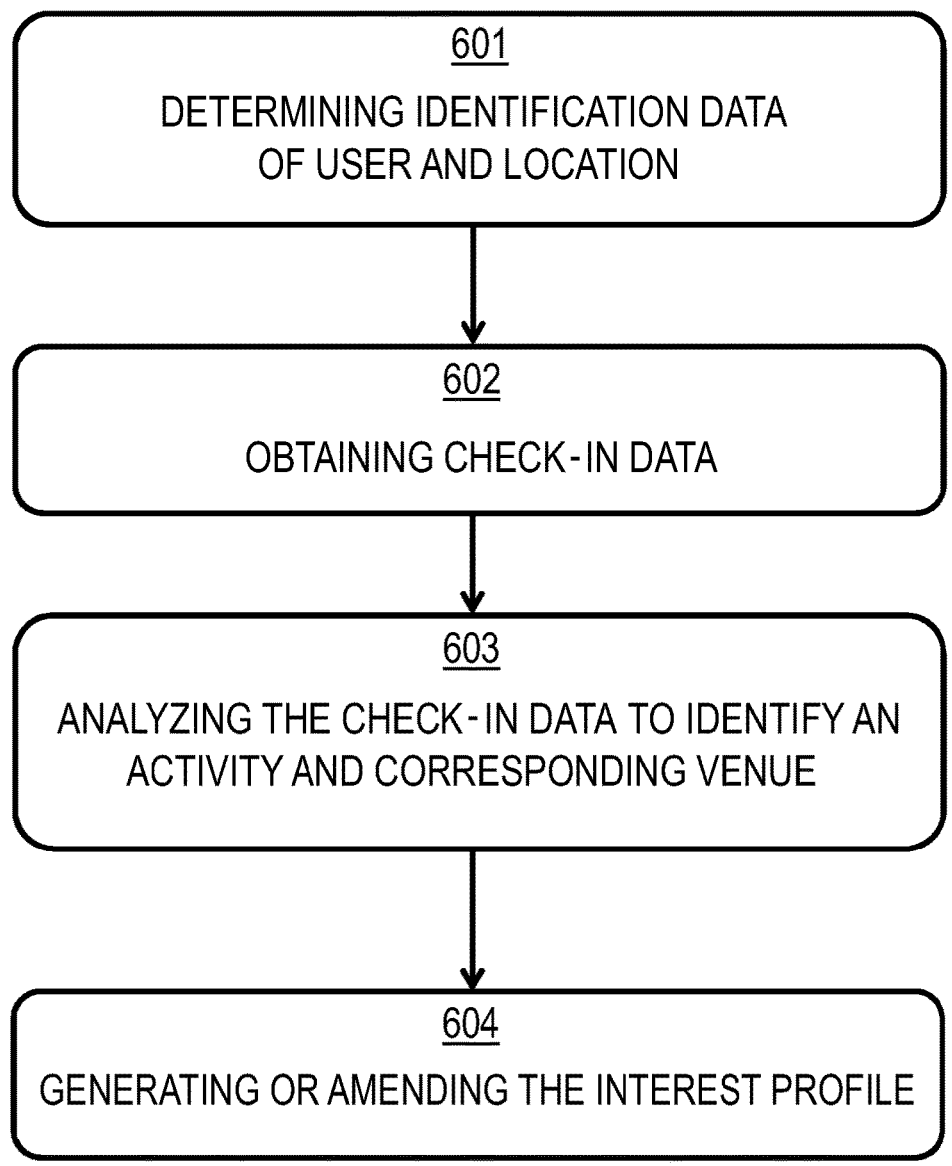
FIG. 36 is a flow diagram representative of steps performed according to the invention.

FIG. 36 shows a flow diagram of steps performed by the first and second processing circuitry 104, 114 carrying out the invention.

In step 601, the first processing circuitry identifies a location, geographical area and/or location of the electronic communication device 102 and utilises the identified location to generate check-in data.

In step 602, the second processing circuitry 114 of the check-in service 112 obtains the check-in data from the first processing circuitry 104 of the electronic communication device 102.

In step 603, the second processing circuitry 114 analyses the check-in data to identify at least one activity taking place within the given geographical area of the electronic communication device and at least one corresponding venue within the given geographical area of the electronic communication device 102. The second processing circuitry 114 categorizes said at least one corresponding venue with regard to the corresponding at least one activity.

In step 604, the second processing circuitry 114 updates the interest profile of the registered user in memory, for example the second memory 116, based on the analysing.

It will be appreciated that the present invention has been described above by way of example only and modifications may be made within the scope of the claims which define the invention.

The invention claimed is:

1. A method of providing easy use of the Internet on a portable electronic device through achieving effective target-oriented distribution of goods and services, rational planning and efficient performing of community services and developments which reflect the interests and needs of local individuals, by performing a check-in event of a user via at least one application executable on or accessible via a portable electronic device, the at least one application executable to communicate with a check-in service including a service processor, the check-in service configured to receive check-in data comprising identification data of the user, location data of the portable electronic device, and time data for the check-in event indicative of when the check-in event took place, said method comprising:

determining, by the portable electronic device, the location of the portable electronic device to generate location data, wherein the location data comprises data indicative of a local geographic area in which the portable electronic device is located;

transmitting the check-in data from the portable electronic device to the service;

receiving the check-in data at the service;

analyzing by a processor the check-in data to identify at least one activity taking place within the given geographical area and at least one corresponding venue within the given geographical area, and to categorize said at least one corresponding venue with regard to the corresponding at least one activity; and generating or amending an interest profile of the user based on the analyzing step, wherein the generating the interest profile includes adding fields for activities associated with a user check-in:

wherein said interest profile further includes data related to the user's interaction with the at least one activity corresponding to the at least one venue;

determining a total interest score within a user interest area including activities that the user enjoys doing, activities that the user is indifferent to, and activities that the user keeps away from:

determining a final normalized profile from the determined and analyzed and generated data, and implementing the final normalized profile to more easily use the internet from the portable electronic device.

2. The method of claim 1, further comprising analyzing by a processor interaction of the registered user at the venue to categorise the activity and generate the interest profile.

3. The method of claim 1, wherein the identification data identifies the user accessing the at least one application via the electronic device.

4. The method of claim 1, further comprising storing the user profile at the service.

5. The method of claim 1, further comprising utilising the interest profile by the service to identify sufficiently similar interest profiles of other users stored at the service.

6. The method of claim 1, further comprising notifying the registered user and/or at least some of the users having the similar interest profiles that such users exist.

7. The method of claim 6, further comprising notifying the registered user and/or at least some of the users when it is determined that the registered user and/or the electronic devices of the registered user and/or at least some of the users are within a predetermined distance of each other.

8. The method of claim 7, wherein the other interest profiles have been generated according the steps of claim 1.

9. The method of claim 1, wherein each processor is implemented individually.

10. The method of claim 1, wherein each processor is integrated with each other processor in integrated processing circuitry.

11. The method of claim 1, wherein the service comprises a processor for performing the steps of claim 1, and memory for storing the interest profile of each user.

12. A memory comprising interest profiles generated according to the steps of claim 1.

13. The method of claim 1 wherein the generating the interest profile further includes removing personal user data.

14. A system providing easy use of the Internet on a portable electronic device through achieving effective target-oriented distribution of goods and services, rational planning and efficient performing of community services and developments which reflect the interests and needs of local individuals, the system comprising a first portable electronic device and a second electronic device for use as a check-in, wherein the first portable electronic device comprises processing circuitry configured to:
  determine the location of the first portable electronic device to generate location data, wherein the location data comprises data indicative of a geographical area in which the first portable electronic device is located;
  transmit check-in data from the first portable electronic device to the second electronic device, the check-in data comprising identification data of a user, the location data, and time data for the check-in event indicative of when the check-in event took place;
  and wherein the second electronic device comprises processing circuitry configured to;
  receive the check-in data from the first electronic device,
  analyze the check-in data to identify at least one activity taking place within the given geographical area and at least one corresponding venue within the given geographical area, and to categorize said at least one corresponding venue with regard to the corresponding at least one activity; and
  generate and/or amend an interest profile of the user based on the analysing step, wherein the generating the interest profile includes adding, fields for activities associated with a user check-in
  wherein said interest profile further includes data related to the user's interaction with the at least one activity corresponding to the at least one venue;
  determining a total interest score within a user interest area; including activities that the user enjoys doing, activities that the user is indifferent to, and activities that the user keeps away from:
  determining a final normalized profile from the determined, analyzed and generated data, and
  implementing the final normalized profile to more easily use the internet from the portable electronic device.

15. The electronic device of claim 14, wherein the processing circuitry is further configured to perform the steps of the method of any one of claims 2 to 11.

16. The system of claim 14 wherein the generating the interest profile further includes removing personal user data.

17. A non-transitory computer readable medium providing easy use of the Internet on a portable electronic device through achieving effective target-oriented distribution of goods and services, rational planning and efficient performing of community services and developments which reflect the interests and needs of local individuals, by comprising computer-executable instructions which, when executed by a processor of a portable electronic device, are configured to:
  determine, by the portable electronic device, the location of the portable electronic device to generate location data, wherein the location data comprises data indicative of a geographical area in which the portable electronic device is located;
  transmit the check-in data from the portable electronic device to the service, the check-in data comprising identification data of a user, the location data, and time data for the check-in event indicative of when the check-in event took place;
  receive the check-in data,
  analyze the check-in data to identify at least one activity taking place within the given geographical area and at least one corresponding venue within the given geographical area, and to categorize said at least one corresponding venue with regard to the corresponding at least one activity; and
  generate and/or amend an interest profile of the user based on the analyzing step, wherein the generating the interest profile includes adding fields for activities associated with a user check-in;
  wherein said interest profile comprises data related to the user's interaction with the at least one activity corresponding to the at least one venue;
  determining a total interest score within a user interest area: including activities that the user enjoys doing, activities that the user is indifferent to, and activities that the user keeps away from
  determining a final normalized profile from the from the determined and analyzed and generated data, and
  implementing the final normalized profile to more easily use the internet from the portable electronic device.

18. The non-transitory computer readable medium of claim 17, further comprising computer executable instructions to perform the steps of any one of claims 2 to 11.

19. The non-transitory computer readable medium of claim 17 wherein the generating the interest profile further includes removing personal user data.

20. A method for providing easy use of the Internet on a portable electronic device through achieving effective target-oriented distribution of goods and services, rational planning and efficient performing of community services and developments which reflect the interests and needs of local individuals, by generating an interest profile of an individual who is the registered user of one or more mobile applications that are capable of, or that are linked to a facility that is capable of receiving and storing check-in data comprising information about (i) the registered user ID, (ii)

geographical coordinates of a venue where the user is checking in to said mobile application(s) or to said facility, and (iii) time point when the check-in is taking place, said method comprising:
- (a) determining, by portable electronic device, the location of the portable electronic device to generate location data, wherein the location data comprises data indicative of a geographical area in which the portable electronic device is located;
- (b) transmitting check-in data, including the determined location of the portable electronic device, from the portable electronic device to a service to be stored in one or more databases;
- (c) obtaining information about a registered user of one or more mobile applications from the one or more databases linked to said mobile applications, wherein said information comprises data (i), (ii) and (iii) (as above), wherein said data relates to a selected geographical area and a defined period of time;
- (d) analyzing the information obtained at (c) to identifying public activities associated with the information obtained at (c) and with public venue(s) within the neighborhood indicated by the geographical coordinates of the information obtained at (c), and categorizing said venues with regard to public activity or activities associated with said venues;
- (e) analyzing interaction of the registered user with the activities of identified at (d);
- (f) generating an interest profile of the registered user, wherein said interest profile comprises a description of the user's relation to public activities associated with the venues identified at (d);

wherein the generating the interest profile includes adding fields for activities associated with a user check-in;

determining a total interest score within a user interest area: including activities that the user enjoys doing, activities that the user is indifferent to, and activities that the user keeps away from;

determining a final normalized profile from the from the determined and analyzed and generated data, and implementing the final normalized profile to more easily use the internet from the portable electronic device.

21. The method of claim 20, wherein the method is computer implemented.

22. A computer program comprising computer executable instructions for executing the method according to claim 20 when executed on an electronic device.

23. A database comprising a plurality interest profiles generated according to the method of claim 20.

24. Use of the database of claim 23 for commercial advertising, internet or mobile application-based social networking, personalized recommendations.

25. The method of claim 20 wherein the generating the interest profile further includes removing personal user data.

* * * * *